(12) United States Patent
Lou et al.

(10) Patent No.: US 11,592,647 B2
(45) Date of Patent: Feb. 28, 2023

(54) OPTICAL IMAGING LENS

(71) Applicant: ZHEJIANG SUNNY OPTICAL CO., LTD, Zhejiang (CN)

(72) Inventors: Qiqi Lou, Zhejiang (CN); Fujian Dai, Zhejiang (CN); Liefeng Zhao, Zhejiang (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 323 days.

(21) Appl. No.: 17/069,887

(22) Filed: Oct. 14, 2020

(65) Prior Publication Data

US 2021/0191076 A1    Jun. 24, 2021

(30) Foreign Application Priority Data

Dec. 24, 2019  (CN) .......................... 201911345659.X

(51) Int. Cl.
  *G02B 9/60*    (2006.01)
  *G02B 13/18*   (2006.01)
  (Continued)

(52) U.S. Cl.
  CPC ............... *G02B 9/60* (2013.01); *G02B 13/18* (2013.01); *G02B 3/02* (2013.01); *G02B 3/04* (2013.01); *G02B 5/005* (2013.01); *G02B 13/006* (2013.01); *G02B 13/007* (2013.01); *G02B 13/0045* (2013.01); *G02B 13/0055* (2013.01); *G02B 13/0065* (2013.01); *G02B 13/02* (2013.01)

(58) Field of Classification Search
  CPC .......... G02B 9/60; G02B 13/18; G02B 5/005; G02B 13/0045; G02B 13/0055; G02B 13/006; G02B 13/0065; G02B 13/007; G02B 13/02; G02B 3/02; G02B 3/04
  USPC ........ 359/714, 726, 728, 740, 746, 763–770
  See application file for complete search history.

(56) References Cited

U.S. PATENT DOCUMENTS 9,036,272 B2 * 5/2015 Huang ................... G02B 13/18
                                                 359/713
10,768,395 B2 * 9/2020 Wenren .............. G02B 13/0045
(Continued)

FOREIGN PATENT DOCUMENTS

CN    105938235 A    9/2016
CN    106199908 A   12/2016
(Continued)

*Primary Examiner* — Evelyn A Lester
(74) *Attorney, Agent, or Firm* — Gang Yu

(57) ABSTRACT

The application discloses an optical imaging lens. The optical imaging lens sequentially includes from an object side to an image side along an optical axis: a first lens having a focal power; a diaphragm; a second lens having a focal power; a third lens having a focal power, and provided with an object-side surface and an image-side surface, the object-side surface is convex surface, the image-side surface is a concave surface; a fourth lens having a positive focal power, and provided with an object-side surface and an image-side surface, the object-side surface is a concave surface, the image-side surface is a convex surface; and a fifth lens having a negative focal power; at least one aspherical mirror surface is included in an object-side surface of the first lens to an image-side surface of the fifth lens; the optical imaging lens meets the following relational expressions: f/EPD<1.5, and 2 mm<ImgH*EPD/f<3 mm.

20 Claims, 15 Drawing Sheets

(51) Int. Cl.
*G02B 3/04* (2006.01)
*G02B 13/00* (2006.01)
*G02B 13/02* (2006.01)
*G02B 3/02* (2006.01)
*G02B 5/00* (2006.01)

(56) References Cited

U.S. PATENT DOCUMENTS

| | | | | |
|---|---|---|---|---|
| 10,983,311 B2* | 4/2021 | Zhang | | G02B 13/0045 |
| 11,402,611 B2* | 8/2022 | Lv | | G02B 9/60 |
| 2015/0198790 A1* | 7/2015 | Tanaka | | G02B 13/0045 |
| | | | | 359/714 |
| 2016/0377831 A1* | 12/2016 | Liu | | G02B 13/0045 |
| | | | | 359/714 |
| 2016/0377832 A1* | 12/2016 | Liu | | G02B 9/60 |
| | | | | 359/714 |
| 2019/0121102 A1* | 4/2019 | Zhang | | G02B 13/0045 |
| 2019/0146182 A1* | 5/2019 | Liao | | G02B 13/0045 |
| | | | | 359/714 |
| 2019/0146189 A1* | 5/2019 | Lyu | | G02B 9/64 |
| | | | | 359/708 |
| 2019/0179122 A1* | 6/2019 | Zhang | | G02B 9/64 |
| 2019/0243093 A1* | 8/2019 | Wenren | | G02B 9/62 |
| 2021/0181470 A1* | 6/2021 | Lv | | G02B 13/0045 |
| 2022/0308318 A1* | 9/2022 | Lv | | G02B 13/0045 |

FOREIGN PATENT DOCUMENTS

| | | | | |
|---|---|---|---|---|
| CN | 106199909 A | | 12/2016 | |
| CN | 106199911 A | | 12/2016 | |
| CN | 106405796 A | * | 2/2017 | G02B 9/60 |
| CN | 107167902 A | | 9/2017 | |
| CN | 107608057 A | | 1/2018 | |
| CN | 110221398 A | | 9/2019 | |
| CN | 110542985 | * | 6/2022 | G02B 13/0045 |
| JP | 2000035534 A | | 2/2000 | |
| WO | WO 2018090609 A1 | * | 5/2018 | G02B 9/60 |

* cited by examiner

OPTICAL IMAGING LENS

CROSS-REFERENCE TO RELATED APPLICATIONS

The present application claims priority to Chinese Patent Application No. 201911345659.X, filed to the National Intellectual Property Administration, PRC (CNIPA) on Dec. 24, 2019, the disclosure of which is hereby incorporated by reference in its entirety.

TECHNICAL FIELD

The application relates to the field of optical components, and more particularly, to an optical imaging lens.

BACKGROUND

In recent years, with the development of 5th Generation (5G) technologies, Internet-of-Things (IoT) technologies, Artificial Intelligence (AI) technologies and so on, various functions of devices, such as a man-machine interaction function and an environment recognition function, are increasingly perfected and enriched; and on the other hand, increasingly higher requirements are also imposed on accuracy, sensitivity and other performances of the devices.

For example, an Augmented Reality (AR) technology is a technology skillfully integrated with virtual information and a real word. With the utilization of multiple technological means like multimedia, Three-Dimensional (3D) modeling, real-time tracking and registration, intelligent interaction, and sensing, the virtual information generated by computers, such as texts, images, 3D models, music and videos, is simulated and applied to the real word; and the two types of information are complemented to each other to implement "augmentation" on the real world. In order to acquire environmental information in the AR technology, it is necessary for the devices to recognize the real world and 3D scenarios. In some working environments, for instance, when mobile phones and other devices are used, it is expected that a camera module thereon can work at a high resolution ratio. The camera module is often provided with a Charge-coupled Device (CCD) image sensor or a Complementary Metal Oxide Semiconductor (CMOS) image sensor, and further provided with an optical imaging lens. The optical imaging lens can gather light rays on an object side, and the imaging light rays travel along an optical path of the optical imaging lens and are irradiated onto the image sensor; and then, the image sensor converts an optical signal into an electrical signal to form an image data.

When the environmental information is acquired, a Time of Flight (ToF) distance measurement method may be used. In the technology, the sensor is typically used to transmit modulated near-infrared light, and the near-infrared light is reflected to the sensor when encountering an object. Then, the sensor calculates a time difference or a phase difference between transmission and reflection, and obtains a distance of a photographed scenery by conversion, thereby generating depth information. The ToF method has high measurement accuracy, a good environmental adaptability and a large recognizable depth, and thus is widely applied to the mobile phones, IoTs, AIs and other scenarios.

For the purpose of meeting the imaging requirements, an optical imaging lens having a large aperture and a high resolution ratio is desired on the market.

SUMMARY

Some embodiments of the application provides an optical imaging lens which may be applied to portable electronic products, and may at least solve or partially solve at least one of the above shortcomings in a related art.

One embodiment of the application provides an optical imaging lens, which may sequentially include from an object side to an image side along an optical axis: a first lens having a focal power; a diaphragm; a second lens having a focal power; a third lens having a focal power, and provided with an object-side surface and an image-side surface, the object-side surface is convex surface, the image-side surface is a concave surface; a fourth lens having a positive focal power, and provided with an object-side surface and an image-side surface, the object-side surface is a concave surface, the image-side surface is a convex surface; and a fifth lens having a negative focal power.

In an implementation mode, at least one aspherical mirror surface is included in an object-side surface of the first lens to an image-side surface of the fifth lens.

In an implementation mode, the optical imaging lens may meet a following relational expression: 2 mm<ImgH*EPD/f<3 mm, wherein, the f is a total effective focal length of the optical imaging lens, the EPD is an entrance pupil diameter of the optical imaging lens, and the ImgH is a half of a length of a diagonal line of an effective pixel region on an imaging surface of the optical imaging lens.

In an implementation mode, the optical imaging lens may meet a following relational expression: f/EPD<1.5.

In an implementation mode, the optical imaging lens may further meet a relational expression: 0.3<f1/(f3+f4)<1.3, wherein, the f1 is an effective focal length of the first lens, the f3 is an effective focal length of the third lens, and the f4 is an effective focal length of the fourth lens.

In an implementation mode, the optical imaging lens may further meet a relational expression: −1.1<f/(R7+R8)<−0.7, wherein, the R7 is a curvature radius of the object-side surface of the fourth lens, and the R8 is a curvature radius of the image-side surface of the fourth lens.

In an implementation mode, the optical imaging lens may further meet a relational expression: 1.5<R9/R10<2.2, wherein, the R9 is a curvature radius of an object-side surface of the fifth lens, and the R10 is a curvature radius of an image-side surface of the fifth lens.

In an implementation mode, a maximum Field of View (FOV) of the optical imaging lens may meet 80°≤FOV<85°.

In an implementation mode, the optical imaging lens may further meet a relational expression: 1.1<(CT3+T34)/CT4<1.4, wherein, the CT3 is a central thickness of the third lens on the optical axis, the T34 is a spacing distance on the optical axis between the third lens and the fourth lens, and the CT4 is a central thickness of the fourth lens on the optical axis.

In an implementation mode, the optical imaging lens may further meet a relational expression: 3.5<SL/(CT1+T12+CT2)<3.8, wherein, the SL is a spacing distance on the optical axis between the diaphragm and the imaging surface, the CT1 is a central thickness of the first lens on the optical axis, the T12 is a spacing distance on the optical axis between the first lens and the second lens, and the CT2 is a central thickness of the second lens on the optical axis.

In an implementation mode, the optical imaging lens may further meet a relational expression: 4.6<f45/(CT4+CT5)<5.7, wherein, the f45 is a synthetic focal length for the fourth lens and the fifth lens, the CT4 is a central thickness of the fourth lens on the optical axis, and the CT5 is a central thickness of the fifth lens on the optical axis.

In an implementation mode, the optical imaging lens may further meet a relational expression: 1.7<SAG42/SAG22<2.5, wherein, the SAG42 is an on-axis distance from an intersection between the image-side surface of the fourth lens and the optical axis to an effective radius vertex of the image-side surface of the fourth lens, and the SAG22 is an on-axis distance from an intersection between an image-side surface of the second lens and the optical axis to an effective radius vertex of the image-side surface of the second lens.

In an implementation mode, the optical imaging lens may further meet a relational expression: 2.8<DT51/(SAG51+SAG52)<5.8, wherein, the DT51 is an effective semi-diameter of an object-side surface of the fifth lens, the SAG51 is an on-axis distance from an intersection between the object-side surface of the fifth lens and the optical axis to an effective radius vertex of the object-side surface of the fifth lens, and the SAG52 is an on-axis distance from an intersection between an image-side surface of the fifth lens and the optical axis to an effective radius vertex of the image-side surface of the fifth lens.

In an implementation mode, the optical imaging lens has a working waveband of 900 nm to 1000 nm.

According to the application, with the adoption of five lenses, and by reasonably distributing the focal power and surface type of each lens, the central thickness of each lens, the on-axis distance of each lens, and the like, the optical imaging lens has at least one beneficial effect of large aperture, high resolution ratio and so on.

BRIEF DESCRIPTION OF THE DRAWINGS

Detailed descriptions are made to unrestrictive implementation modes below in combination with the drawings to make the other characteristics, purposes and advantages of the application more apparent. In the accompanying drawings: In the drawings.

DETAILED DESCRIPTION OF THE EMBODIMENTS

Figure 1:
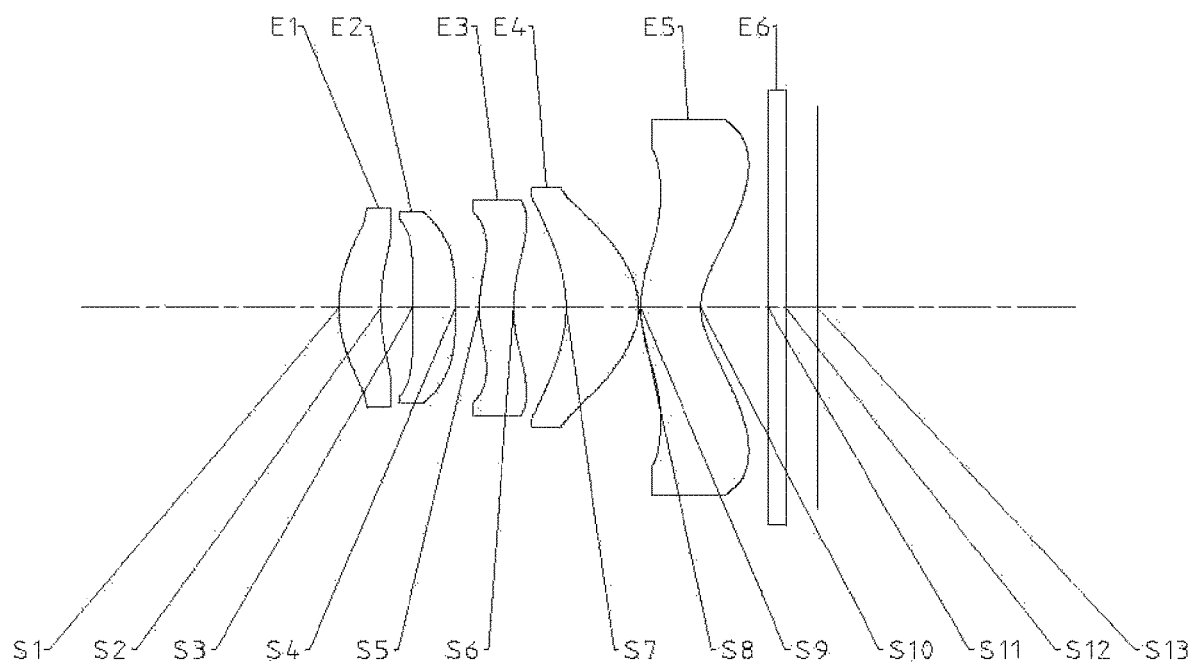
FIG. 1 shows a structure diagram of an optical imaging lens according to embodiment 1 of the application.

For understanding the present application better, more detailed descriptions will be made to each aspect of the present application with reference to the drawings. It is to be understood that these detailed descriptions are only descriptions about the exemplary implementation modes of the present application and not intended to limit the scope of the present application in any manner. In the whole specification, the same reference sign numbers represent the same components. Expression "and/or" includes any or all combinations of one or more in associated items that are listed.

It should be noted that, in this description, the expressions of first, second, third, etc. are only used to distinguish one feature from another feature, and do not represent any limitation to the feature. Thus, a first lens discussed below could also be referred to as a second lens or a third lens without departing from the teachings of the present application.

In the drawings, the thickness, size and shape of the lens have been slightly exaggerated for ease illustration. In particular, a spherical shape or an aspherical shape shown in the drawings is shown by some embodiments. That is, the spherical shape or the aspherical shape is not limited to the spherical shape or the aspherical shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if the lens surface is a concave surface and a position of the concave surface is not defined, it indicates that the lens surface is a concave surface at least in the paraxial region. A surface of each lens closest to an object-side is called an object-side surface of the lens, and a surface of each lens closest to an imaging surface is called an image-side surface of the lens.

It also should be understood that terms "include", "including", "have", "contain" and/or "containing", used in this description, represent existence of a stated feature, component and/or part but do not exclude existence or addition of one or more other features, components and parts and/or combinations thereof. In addition, expressions like "at least one in . . . " may appear after a list of listed features not to modify an individual component in the list but to modify the listed features. Moreover, when the implementation modes of the present application are described, "may" is used to represent "one or more implementation modes of the present application". Furthermore, term "exemplary" refers to an example or exemplary description.

Unless otherwise defined, all terms (including technical terms and scientific terms) used in the present application have the same meanings usually understood by the general technical personnel in the field of the present application. It also should be understood that the terms (for example, terms defined in a common dictionary) should be explained to have meanings consistent with the meanings in the context of correlation technique and cannot be explained with ideal or excessively formal meanings, unless clearly defined like this in the present application.

It should be noted that the embodiments in the present application and features in the embodiments can be combined without conflicts. The present application will be described below with reference to the drawings and in combination with the embodiments in detail.

The features, principles and other aspects of the present application will be described below in detail.

An optical imaging lens according to an exemplary implementation mode of the application may include five lenses with a focal power, i.e., a first lens, a second lens, a third lens, a fourth lens, and a fifth lens. The five lenses are sequentially arranged from an object side to an image side along an optical axis. Any two adjacent lenses in the first lens to the fifth lens may have air space between them.

In an exemplary implementation mode, the first lens may have the positive focal power or negative focal power; the second lens may have the positive focal power or negative focal power; the third lens may have the positive focal power or negative focal power, an object-side surface thereof may be a convex surface, and an image-side surface may be a concave surface; the fourth lens may have the positive focal power, an object-side surface thereof may be a concave surface, and an image-side surface may be a convex surface; and the fifth lens may have the negative focal power. By reasonably controlling the positive and negative distribution for the focal power of each component of the system and the curvature of the surface type of the lens, the low-order aberration of the system is effectively balanced and controlled.

In an exemplary implementation mode, the first lens has the positive focal power.

In an exemplary implementation mode, the third lens has the positive focal power.

In an exemplary implementation mode, an object-side surface of the fifth lens may be a convex surface. Exemplarily, an image-side surface of the fifth lens may be a concave surface.

In an exemplary implementation mode, the optical imaging lens may further include at least one diaphragm. The diaphragm may be arranged at a proper position as required, for example, between the first lens and the second lens. Optionally, the optical imaging lens may further include an optical filter for correcting color deviation and/or protective glass for protecting a photosensitive element on the imaging surface.

In the implementation mode of the application, at least one of mirror surfaces of the lenses is an aspherical mirror surface, that is, at least one from the object-side surface of the first lens to the image-side surface of the fifth lens is the aspherical mirror surface. The aspherical mirror surface has the characteristic that the curvature keeps changing from a center of the lens to a periphery of the lens. Unlike a spherical lens with a constant curvature from the center of the lens to the periphery of the lens, an aspherical lens has a better curvature radius characteristic and the advantages of improving distortion aberrations and improving astigmatic aberrations. With the adoption of the aspherical lens, the aberrations during imaging may be eliminated as much as possible, thereby improving the imaging quality. Optionally, at least one of the object-side surface and the image-side surface of each of the first lens, the second lens, the third lens, the fourth lens and the fifth lens is the aspherical mirror surface. Optionally, both the object-side surface and the image-side surface of each of the first lens, the second lens, the third lens, the fourth lens and the fifth lens are the aspherical mirror surfaces.

In an exemplary implementation mode, according to the application, a total effective focal length f of the optical imaging lens, an Entrance Pupil Diameter (EPD) of the optical imaging lens, and a half of a length of a diagonal line of an effective pixel region on an imaging surface of the optical imaging lens may meet 2 mm<ImgH*EPD/f<3 mm. More specifically, the f, the EPD and the ImgH may further meet 2.05 mm<ImgH*EPD/f<2.40 mm. By matching the total effective focal length, the EPD and image height of the optical imaging lens, the optical imaging lens can have the characteristics of a large aperture and a large image surface. The optical imaging lens has a high resolution ratio and can implement good background virtualization.

Exemplarily, the total effective focal length f and the EPD may further meet f/EPD<1.5. More specifically, the f and the EPD may further meet 1.3<f/EPD<1.43. By further defining a ratio of the total effective focal length to the EPD, the characteristics of the large aperture and the large image surface of the optical imaging lens can be better ensured.

In an exemplary implementation mode, the optical imaging lens of the application may further meet a conditional expression 80°<FOV<85°, the FOV being a maximum field of view of the optical imaging lens. More specifically, the FOV may further meet 81.0°<FOV<82.0°. By controlling the maximum FOV of the optical imaging lens, it can be ensured that the photographing field of the optical imaging lens has a large range, and thus more complete image information can be provided for the imaging of the optical imaging lens.

In an exemplary implementation mode, an effective focal length f1 of the first lens in the optical imaging lens of the application, an effective focal length f3 of the third lens, and an effective focal length f4 of the fourth lens may meet $0.3<f1/(f3+f4)<1.3$. More specifically, the f1, the f3 and the f4 may further meet $0.35<f1/(f3+f4)<1.25$. By matching the focal power of the first lens, the focal power of the third lens and the focal power of the fourth lens, the optical imaging lens can well implement optical characteristics, and may effectively reduce the axial chromatic aberration and astigmatism of the optical imaging lens.

In an exemplary implementation mode, the total effective focal length f of the optical imaging lens of the application, a curvature radius R7 of the object-side surface of the fourth lens, and a curvature radius R8 of an image-side surface of the fourth lens may meet $-1.1<f/(R7+R8)<-0.7$. More specifically, the f, the R7 and the R8 may further meet $-1.05<f/(R7+R8)<-0.75$. By controlling the curvature radii of the two mirror surfaces of the fourth lens, and controlling a ratio of the total effective focal length to the sum of the two curvature radii, the fourth lens serves as a main part for the focal power of the optical imaging lens; and thus, the focal power of each lens of the optical imaging lens is well distributed, and the imaging quality of the optical imaging lens may be improved. Furthermore, by setting the focal powers of other lenses to compensate the fourth lens, for example, by simultaneously meeting $0.3<f1/(f3+f4)<1.3$, the imaging quality of the optical imaging lens may further be improved.

In an exemplary implementation mode, in the optical imaging lens of the application, a curvature radius R9 of the object-side surface of the fifth lens, and a curvature radius R10 of the image-side surface of the fifth lens may meet $1.5<R9/R10<2.2$. More specifically, the R9 and the R10 may further meet $1.55<R9/R10<2.15$. By controlling the curvature radii of the two mirror surfaces of the fifth lens, the fifth lens is used to compensate the focal power of the lens in an object-side direction on one hand, and on the other hand, the axial aberration of the optical imaging lens can be effectively reduced.

In an exemplary implementation mode, in the optical imaging lens of the application, a central thickness CT3 of the third lens on the optical axis, a spacing distance T34 on the optical axis between the third lens and the fourth lens, and a central thickness CT4 of the fourth lens on the optical axis may meet $1.1<(CT3+T34)/CT4<1.4$. By matching the central thickness of the third lens, the central thickness of the fourth lens, and the spacing distance between the third lens and the fourth lens, the ghost image and aberration at the central field of the optical imaging lens can be well corrected, and thus the optical imaging lens has the high imaging quality.

In an exemplary implementation mode, in the optical imaging lens of the application, a spacing distance SL on the optical axis between the diaphragm and the imaging surface, a central thickness CT1 of the first lens on the optical axis, a spacing distance T12 on the optical axis between the first lens and the second lens, and a central thickness CT2 of the second lens on the optical axis may meet $3.5<SL/(CT1+T12+CT2)<3.8$. More specifically, the SL, the CT1, the T12 and the CT2 may further meet $3.55<SL/(CT1+T12+CT2)<3.75$. By controlling the position of the diaphragm, and matching the position of the diaphragm with the first lens and the second lens, the size of the front end (the part towards the object side) of the optical imaging system may be reduced on one hand; and on the other hand, the comatic aberration and distortion of the optical imaging lens may be well corrected.

In an exemplary implementation mode, in the optical imaging lens of the application, a synthetic focal length f45 for the fourth lens and the fifth lens, a central thickness CT4 of the fourth lens on the optical axis, and a central thickness CT5 of the fifth lens on the optical axis may meet $4.6<f45/(CT4+CT5)<5.7$. More specifically, the CT4, the f45 and the CT5 may further meet $4.65<f45/(CT4+CT5)<5.68$. By controlling a ratio of the synthetic focal length for the fourth lens and the fifth lens to the sum of the central thicknesses of them, the focal power of the lens located in the object-side direction of the fourth lens may be well compensated, and the paraxial aberration of the optical imaging lens is effectively reduced.

In an exemplary implementation mode, in the optical imaging lens of the application, an on-axis distance SAG42 from an intersection between the image-side surface of the fourth lens and the optical axis to an effective radius vertex of the image-side surface of the fourth lens, and an on-axis distance SAG22 from an intersection between the image-side surface of the second lens and the optical axis to an effective radius vertex of the image-side surface of the second lens may meet $1.7<SAG42/SAG22<2.5$. More specifically, the SAG42 and the SAG22 may further meet $1.75<SAG42/SAG22<2.49$. By controlling a rise of the image-side surface of the fourth lens and a rise of the image-side surface of the second lens, the off-axis aberration of the optical imaging lens is reduced, and the imaging quality of the optical imaging lens is improved.

In an exemplary implementation mode, in the optical imaging lens of the application, an effective semi-diameter DT51 of the object-side surface of the fifth lens, an on-axis distance SAG51 from an intersection between the object-side surface of the fifth lens and the optical axis to an effective radius vertex of the object-side surface of the fifth lens, and an on-axis distance SAG52 from an intersection between the image-side surface of the fifth lens and the optical axis to an effective radius vertex of the image-side surface of the fifth lens may meet $2.8<DT51/(SAG51+SAG52)<5.8$. By matching the sum of the rises of the two mirror surfaces of the fifth lens with the effective semi-diameter of the object-side surface of the fifth lens, the field curvature of the optical imaging lens can be effectively reduced. In addition, the Chief Ray Angle (CRA) of the optical imaging lens can further be controlled, such that the CRA of the optical imaging lens can be well matched with the CRA of the photosensitive chip.

The optical imaging lens of the application may use near-infrared light of which the waveband is 900 nm to 1000 nm. The sensor transmits modulated near-infrared light to the object side, the near-infrared light is reflected when encountering the object, and the reflected near-infrared light may be received by the optical imaging lens. By calculating a time difference or a phase difference between the transmitted near-infrared light and the received reflected light, a distance of the object in the photographed scenery relative to the sensor and other depth information may be obtained by conversion.

The optical imaging lens according to the above implementation mode of the application may use multiple lenses, such as the five lenses. By reasonably distributing the focal power and surface type of each lens, the central thickness of each lens, the on-axis distance of each lens and the like, the size of the imaging system can be effectively shortened, the sensitivity of the imaging system is reduced, and the machinability of the imaging system is improved; and therefore, the optical imaging lens is more beneficial to production and can be adapted for portable electronic products. Furthermore, the optical imaging lens of the application further has excellent optical performances such as the large aperture and the high resolution ratio.

However, those skilled in the art should know that the number of the lenses forming the optical imaging lens may be changed without departing from the technical solutions claimed in the application to achieve each result and advantage described in the specification. For example, although descriptions are made in the implementation with five lenses as an example, the optical imaging lens is not limited to five lenses. If necessary, the optical imaging lens may further include another number of lenses.

Specific embodiments of the optical imaging lens applied to the above-mentioned implementation mode will further be described below with reference to the drawings.

Embodiment 1

The optical imaging lens according to embodiment 1 of the application will be described below with reference to FIG. 1 to FIG. 2D. FIG. 1 is a structure diagram of an optical imaging lens according to embodiment 1 of the application.

As shown in FIG. 1, an optical imaging lens sequentially includes from an object side to an image side along an optical axis: a first lens E1, a diaphragm STO, a second lens E2, a third lens E3, a fourth lens E4, a fifth lens E5 and an optical filter E6.

The lens E1 has a positive focal power, an object-side surface S1 thereof is a convex surface, and an image-side surface S2 is a concave surface. The second element E2 has a positive focal power, an object-side surface S3 thereof is a convex surface, and an image-side surface S4 is a convex surface. The third lens E3 has a positive focal power, an object-side surface S5 thereof is a convex surface, and an image-side surface S6 is a concave surface. The fourth element E4 has a positive focal power, an object-side surface S7 thereof is a concave surface, and an image-side surface S8 is a convex surface. The fifth lens E5 has a negative focal power, an object-side surface S9 thereof is a convex surface, and an image-side surface S10 is a concave surface. The optical filter E6 has an object-side surface S11 and an image-side surface S12. The optical imaging lens is provided with an imaging surface S13. Light from an object sequentially penetrates through each of the surfaces S1 to S12 and is finally imaged on the imaging surface S13.

Table 1 shows basic parameters of the optical imaging lens of embodiment 1, in which the units of curvature radius, thickness/distance and focal length are millimeter (mm).

TABLE 1

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | 450.0000 | | | | |
| S1 | Aspherical | 2.4271 | 0.4829 | 1.64 | 20.4 | 10.01 | −7.0118 |
| S2 | Aspherical | 3.6230 | 0.1421 | | | | −11.8534 |
| STO | Spherical | Infinite | 0.2277 | | | | |
| S3 | Aspherical | 16.1593 | 0.4984 | 1.64 | 20.4 | 16.60 | −2.3001 |
| S4 | Aspherical | −30.0000 | 0.2763 | | | | 96.9738 |
| S5 | Aspherical | 2.4421 | 0.4000 | 1.64 | 20.4 | 22.20 | 1.5376 |
| S6 | Aspherical | 2.7656 | 0.6090 | | | | −5.6459 |
| S7 | Aspherical | −2.4142 | 0.8500 | 1.64 | 20.4 | 3.08 | −0.6141 |
| S8 | Aspherical | −1.2274 | 0.0250 | | | | −1.0127 |
| S9 | Aspherical | 2.3419 | 0.6983 | 1.64 | 20.4 | −4.23 | −1.3722 |
| S10 | Aspherical | 1.1066 | 0.7803 | | | | −5.1443 |
| S11 | Spherical | Infinite | 0.2100 | 1.52 | 64.2 | | |
| S12 | Spherical | Infinite | 0.3645 | | | | |
| S13 | Spherical | Infinite | | | | | |

In the embodiment 1, the total effective focal length f of the optical imaging lens is 3.49 mm, the on-axis distance TTL from the object-side surface S1 of the first lens E1 to the imaging surface S13 is 5.56 mm, and ImgH is the half of the length of the diagonal line in the effective pixel region on the imaging surface S13, ImgH is 2.94 mm.

In embodiment 1, both the object-side surface and image-side surface of any lens in the first lens E1 to the fifth lens E5 are aspherical surfaces, and the surface type x of each aspherical lens may be defined by use of, but not limited to, the following aspherical surface formula:

$$x = \frac{ch^2}{1+\sqrt{1-(k+1)c^2h^2}} + \sum A_i h^i \quad (1)$$

where x is the distance rise between a position of the aspherical surface at a height h in the direction of the optical axis and the aspherical surface vertex; c is the paraxial curvature of the aspherical surface, c=1/R (namely, the paraxial curvature c is a reciprocal of the curvature radius R in Table 1); k is the conic coefficient; and Ai is the i-th-order correction coefficient of the aspherical surface. Table 2 shows the higher-order coefficients $A_4$, $A_6$, $A_8$, $A_{10}$, $A_{12}$, $A_{14}$, $A_{16}$, $A_{18}$ and $A_{20}$ applicable to the aspherical mirror surfaces S1-S10 in embodiment 1.

TABLE 2

| Surface number | A4 | A6 | A8 | A10 | A12 | A14 | A16 | A18 | A20 |
|---|---|---|---|---|---|---|---|---|---|
| S1 | 4.9607E−02 | −3.3250E−02 | 2.6343E−02 | −2.5580E−02 | 1.2613E−02 | −1.8200E−03 | −1.1600E−03 | 3.9100E−04 | 0.0000E+00 |
| S2 | 1.1094E−02 | −6.1880E−02 | 2.1170E−01 | −5.2453E−01 | 7.6481E−01 | −6.8549E−01 | 3.6930E−01 | −1.0957E−01 | 1.3793E−02 |
| S3 | −6.3040E−02 | 3.3996E−02 | −1.2687E−01 | 2.7126E−01 | −3.9257E−01 | 3.5812E−01 | −1.9730E−01 | 6.0273E−02 | −7.8500E−03 |
| S4 | −1.3225E−01 | 4.6385E−02 | 3.1920E−03 | −4.0880E−02 | 4.0166E−02 | −1.5440E−02 | −6.5000E−04 | 2.1940E−03 | −4.7000E−04 |
| S5 | −1.5007E−01 | 3.3141E−02 | −1.9242E−01 | 4.1576E−01 | −5.0715E−01 | 3.8277E−01 | −1.7763E−01 | 4.6012E−02 | −5.0600E−03 |
| S6 | 1.1951E−02 | −6.9260E−02 | 1.1923E−02 | 5.5122E−02 | −6.4020E−02 | 3.4639E−02 | −1.0310E−02 | 1.5330E−03 | −7.6000E−05 |
| S7 | 5.0615E−02 | 3.5532E−02 | −1.6388E−01 | 2.4009E−01 | −2.0819E−01 | 1.1398E−01 | −3.7750E−02 | 6.8090E−03 | −5.1000E−04 |
| S8 | 1.4901E−01 | −2.2525E−01 | 3.2184E−01 | −3.5597E−01 | 2.6548E−01 | −1.2750E−01 | 3.7681E−02 | −6.1800E−03 | 4.2800E−04 |
| S9 | −5.8630E−02 | 2.3500E−03 | 3.9280E−03 | −3.4200E−03 | 2.0580E−03 | −7.4000E−04 | 1.4900E−04 | −1.6000E−05 | 6.8900E−07 |
| S10 | 4.9870E−03 | −2.3130E−02 | 1.4509E−02 | −5.8300E−03 | 1.6160E−03 | −3.0000E−04 | 3.6100E−05 | −2.4000E−06 | 6.9900E−08 |

Figure 2A:
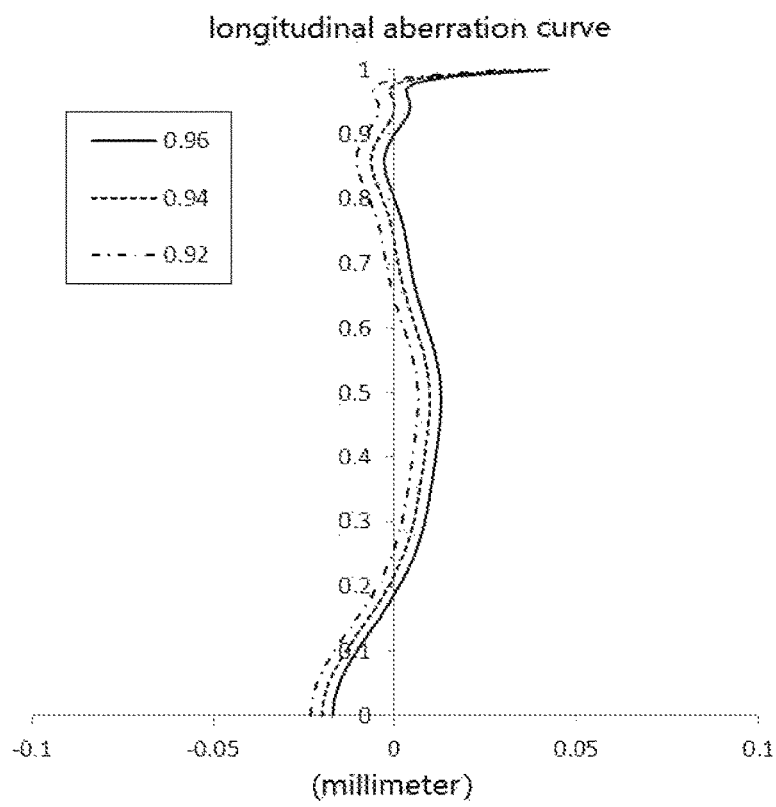
FIG. 2A to FIG. 2D show a longitudinal aberration curve, an astigmatism curve, a distortion curve and a lateral color curve of an optical imaging lens according to embodiment 1 respectively.
Figure 2B:
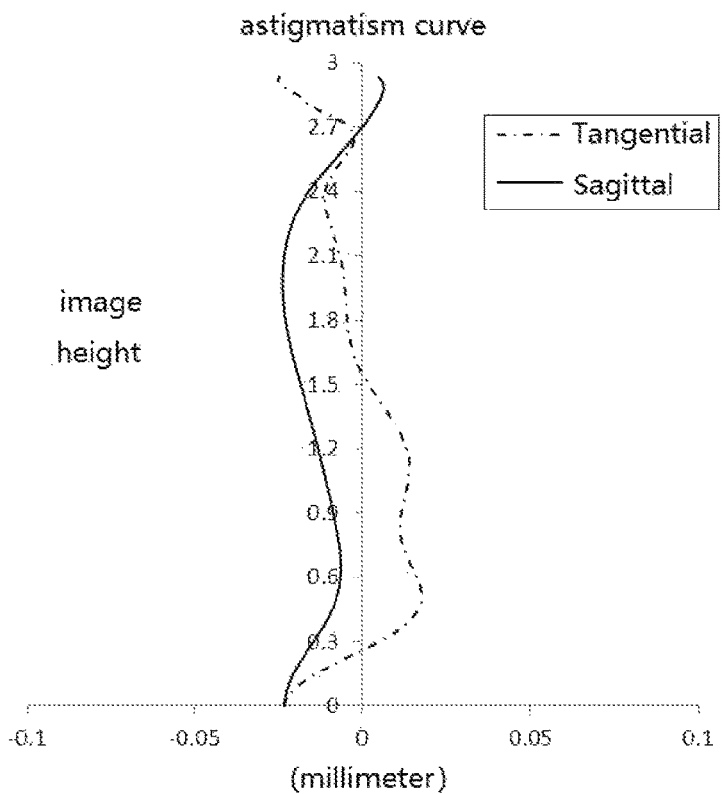
Figure 2C:
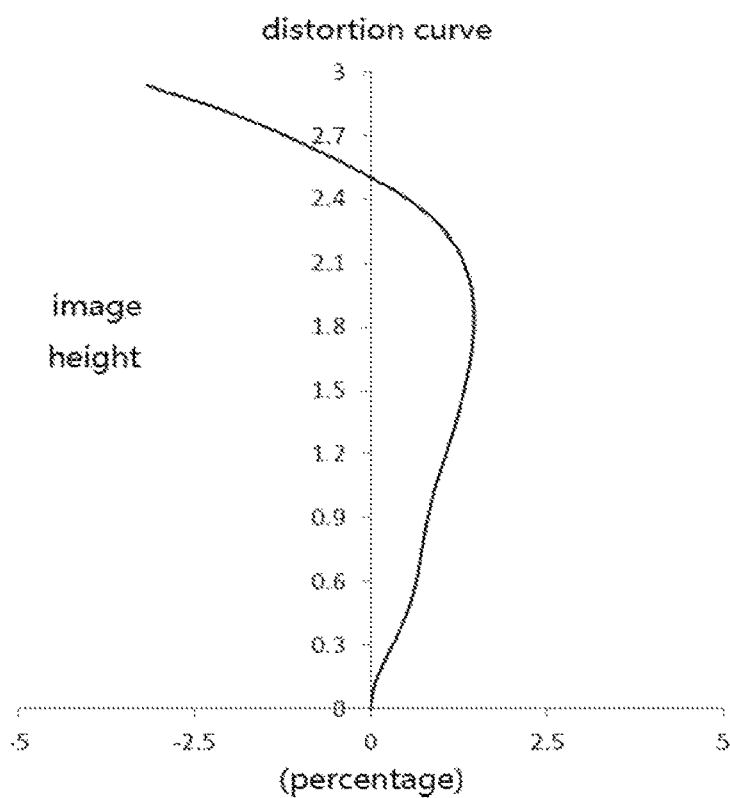
Figure 2D:
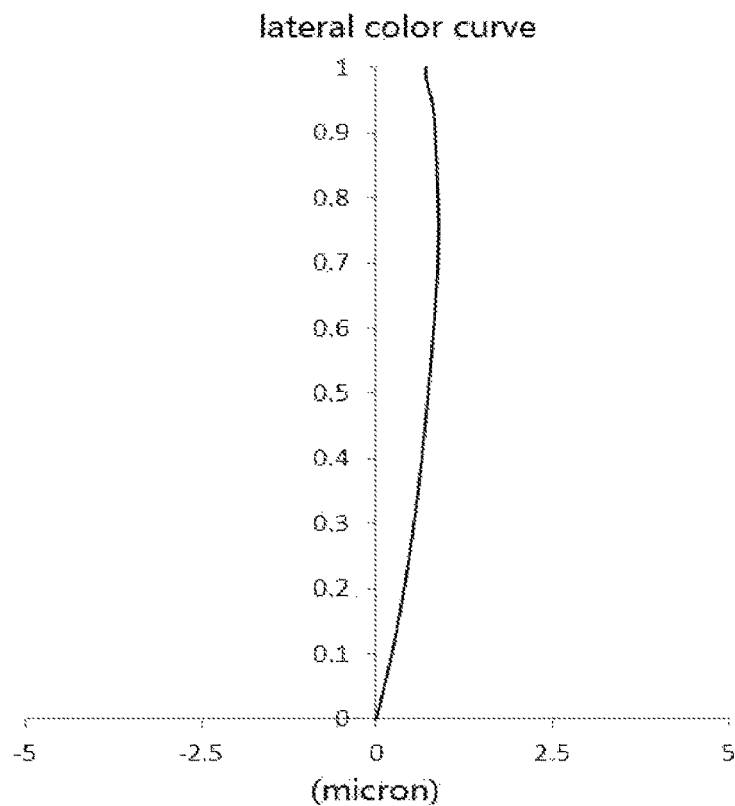

FIG. 2A illustrates a longitudinal aberration curve of the optical imaging lens according to embodiment 1 to represent deviation of a convergence focal point after light with different wavelengths passes through the system. FIG. 2B illustrates an astigmatism curve of the optical imaging lens according to embodiment 1 to represent a meridian image surface curvature and a sagittal image surface curvature. FIG. 2C illustrates a distortion curve of the optical imaging lens according to embodiment 1 to represent distortion values corresponding to different image heights. FIG. 2D illustrates a lateral color curve of the optical imaging lens according to embodiment 1 to represent deviation of different image heights on the imaging surface after the light passes through the system. According to FIG. 2A to FIG. 2D, it can be seen that the optical imaging lens provided in embodiment 1 may achieve high imaging quality.

Embodiment 2

Figure 3:
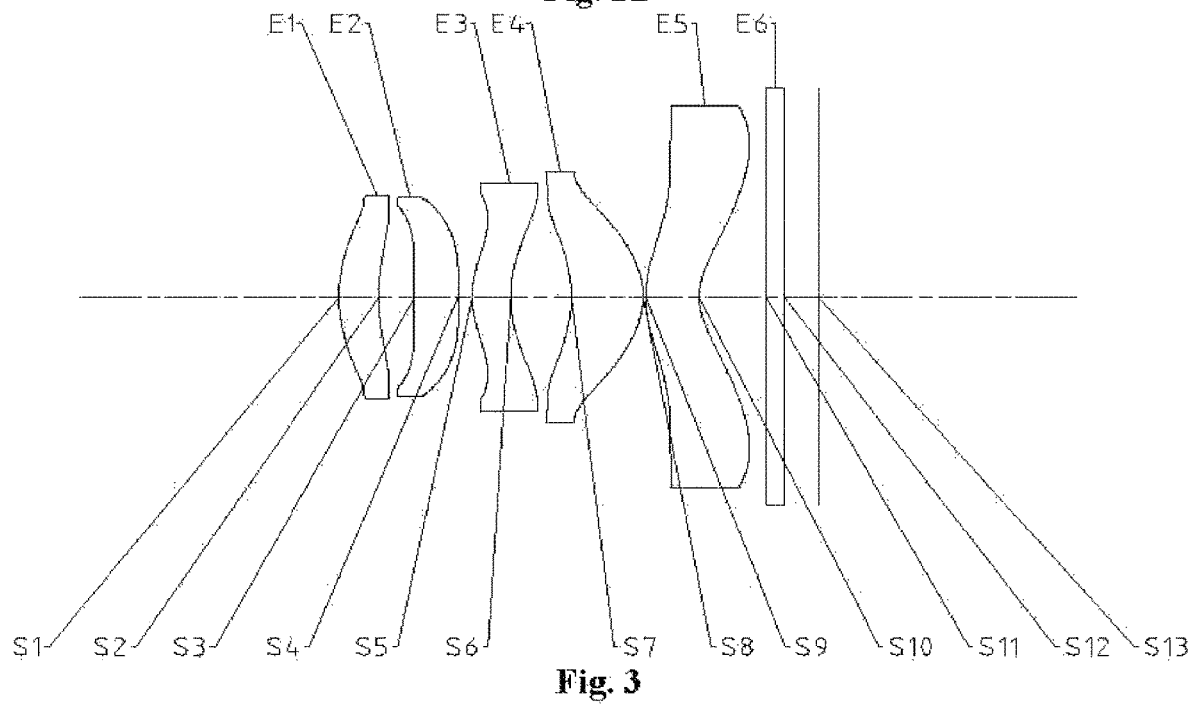
FIG. 3 shows a structure diagram of an optical imaging lens according to embodiment 2 of the application.

The optical imaging lens according to embodiment 2 of the application will be described below with reference to FIG. 3 to FIG. 4D. In the embodiment and the following embodiments, for the ease of clarity, a part of descriptions similar to embodiment 1 are omitted. FIG. 3 is a structure diagram of the optical imaging lens according to embodiment 2 of the application.

As shown in FIG. 3, an optical imaging lens sequentially includes from an object side to an image side along an optical axis: a first lens E1, a diaphragm STO, a second lens E2, a third lens E3, a fourth lens E4, a fifth lens E5 and an optical filter E6.

The lens E1 has a positive focal power, an object-side surface S1 thereof is a convex surface, and an image-side surface S2 is a concave surface. The second lens E2 has a negative focal power, an object-side surface S3 thereof is a convex surface, and an image-side surface S4 is a concave surface. The third lens E3 has a positive focal power, an object-side surface S5 thereof is a convex surface, and an image-side surface S6 is a concave surface. The fourth element E4 has a positive focal power, an object-side surface S7 thereof is a concave surface, and an image-side surface S8 is a convex surface. The fifth lens E5 has a negative focal power, an object-side surface S9 thereof is a convex surface, and an image-side surface S10 is a concave surface. The optical filter E6 has an object-side surface 511 and an image-side surface S12. The optical imaging lens is provided with an imaging surface S13. Light from an object sequentially penetrates through each of the surfaces S1 to S12 and is finally imaged on the imaging surface S13.

In the embodiment 2, the total effective focal length f of the optical imaging lens is 3.49 mm, the on-axis distance TTL from the object-side surface S1 of the first lens E1 to the imaging surface S13 is 5.58 mm, and ImgH is the half of the length of the diagonal line in the effective pixel region on the imaging surface S13, ImgH is 2.95 mm.

Table 3 shows basic parameters of the optical imaging lens of embodiment 2, in which the units of curvature radius, thickness/distance and focal length are millimeter (mm). Table 4 shows high-order coefficients applied to each aspherical mirror surface in embodiment 2. A surface type of each aspherical surface may be defined by formula (1) given in embodiment 1.

TABLE 3

| Surface number | Surface type | Curvature radius | Thickness/ distance | Material | | Focal length | Conic coefficient |
|---|---|---|---|---|---|---|---|
| | | | | Refractive index | Abbe number | | |
| OBJ | Spherical | Infinite | 450.0000 | | | | |
| S1 | Aspherical | 2.5202 | 0.4643 | 1.64 | 20.4 | 10.38 | −7.6759 |
| S2 | Aspherical | 3.7880 | 0.1408 | | | | −11.6578 |
| STO | Spherical | Infinite | 0.2750 | | | | |
| S3 | Aspherical | 52.5852 | 0.5036 | 1.64 | 20.4 | −33.41 | −92.8672 |
| S4 | Aspherical | 15.0621 | 0.1656 | | | | −99.0000 |
| S5 | Aspherical | 1.6037 | 0.4496 | 1.62 | 23.5 | 6.25 | −0.0562 |
| S6 | Aspherical | 2.4500 | 0.7029 | | | | −2.3881 |
| S7 | Aspherical | −2.1527 | 0.8427 | 1.64 | 20.4 | 3.36 | −1.7199 |
| S8 | Aspherical | −1.2349 | 0.0300 | | | | −1.0631 |
| S9 | Aspherical | 1.9855 | 0.6193 | 1.62 | 23.5 | −4.74 | −1.8171 |
| S10 | Aspherical | 1.0419 | 0.7814 | | | | −4.5036 |
| S11 | Spherical | Infinite | 0.2100 | 1.52 | 64.2 | | |
| S12 | Spherical | Infinite | 0.3947 | | | | |
| S13 | Spherical | Infinite | | | | | |

TABLE 4

| Surface number | A4 | A6 | A8 | A10 | A12 | A14 | A16 | A18 | A20 |
|---|---|---|---|---|---|---|---|---|---|
| S1 | 4.5594E−02 | −2.2660E−02 | −9.5400E−03 | 4.1935E−02 | −6.4470E−02 | 5.2028E−02 | −2.3440E−02 | 5.4290E−03 | −4.8000E−04 |
| S2 | 8.1240E−03 | −5.3400E−02 | 1.7884E−01 | −4.2454E−01 | 5.9102E−01 | −5.0924E−01 | 2.6623E−01 | −7.7360E−02 | 9.6160E−03 |
| S3 | −7.2530E−02 | 8.5674E−02 | −2.5046E−01 | 4.6578E−01 | −5.9021E−01 | 4.8338E−01 | −2.4450E−01 | 6.9513E−02 | −8.5000E−03 |
| S4 | −2.5954E−01 | 2.6145E−01 | −3.2007E−01 | 3.6195E−01 | −3.2894E−01 | 2.1257E−01 | −8.9210E−02 | 2.1569E−02 | −2.2800E−03 |
| S5 | −2.0546E−01 | 1.2236E−01 | −2.2787E−01 | 2.7802E−01 | −2.2308E−01 | 1.1814E−01 | −4.1070E−02 | 8.6090E−03 | −8.2000E−04 |
| S6 | 7.4913E−02 | −1.2087E−01 | 3.4094E−02 | 4.7739E−02 | −5.5720E−02 | 2.7129E−02 | −7.0300E−03 | 9.1100E−04 | −4.3000E−05 |
| S7 | 7.1538E−02 | −7.1190E−02 | 7.1070E−02 | −6.4410E−02 | 4.8942E−02 | −2.2760E−02 | 5.8000E−03 | −7.3000E−04 | 3.3100E−05 |
| S8 | 1.3793E−01 | −2.0145E−01 | 2.6461E−01 | −2.6221E−01 | 1.7712E−01 | −7.7840E−02 | 2.1334E−02 | −3.2900E−03 | 2.1600E−04 |
| S9 | −9.4880E−02 | 4.6735E−02 | −2.7770E−02 | 1.3631E−02 | −4.5500E−03 | 9.8200E−04 | −1.3000E−04 | 9.7200E−06 | −3.1000E−07 |
| S10 | −2.3370E−02 | 5.5370E−03 | −3.1100E−03 | 1.5380E−03 | −4.6000E−04 | 8.0900E−05 | −8.3000E−06 | 4.5600E−07 | −1.1000E−08 |

Figure 4A:
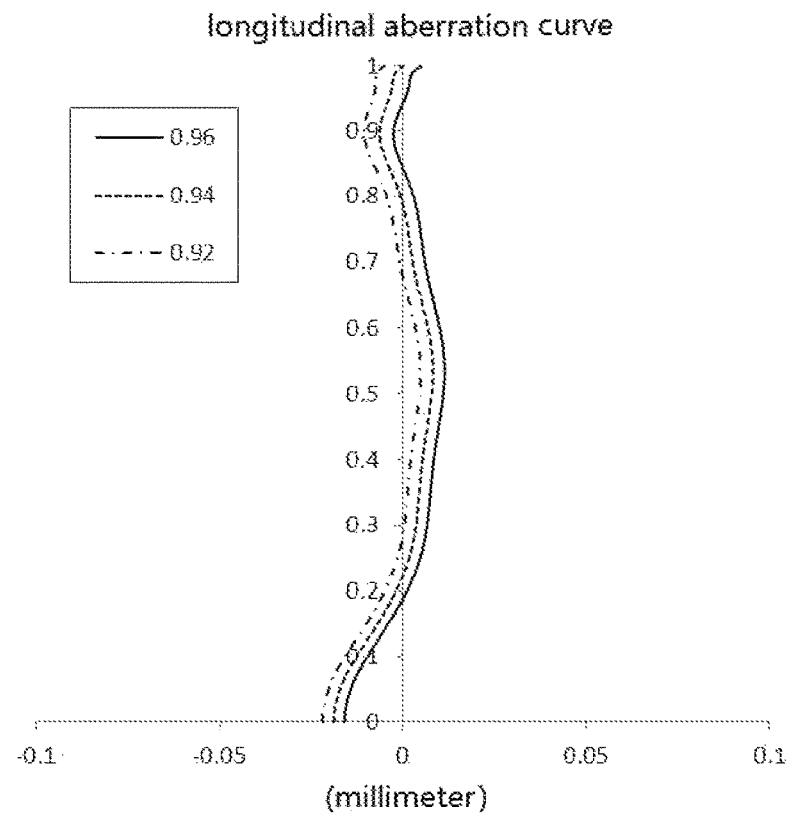
FIG. 4A to FIG. 4D show a longitudinal aberration curve, an astigmatism curve, a distortion curve and a lateral color curve of an optical imaging lens according to embodiment 2 respectively.
Figure 4B:
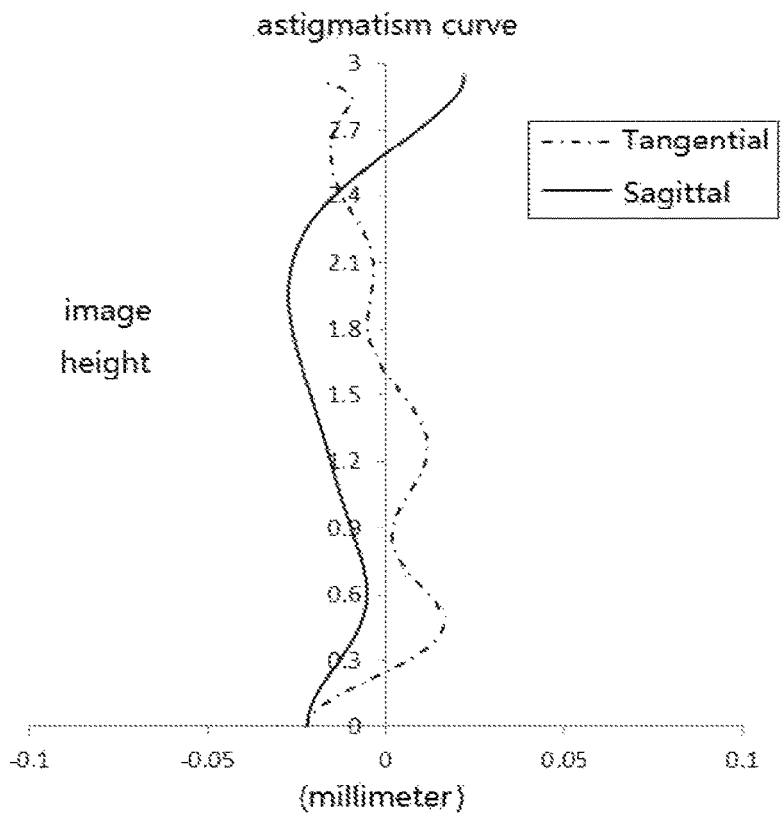
Figure 4C:
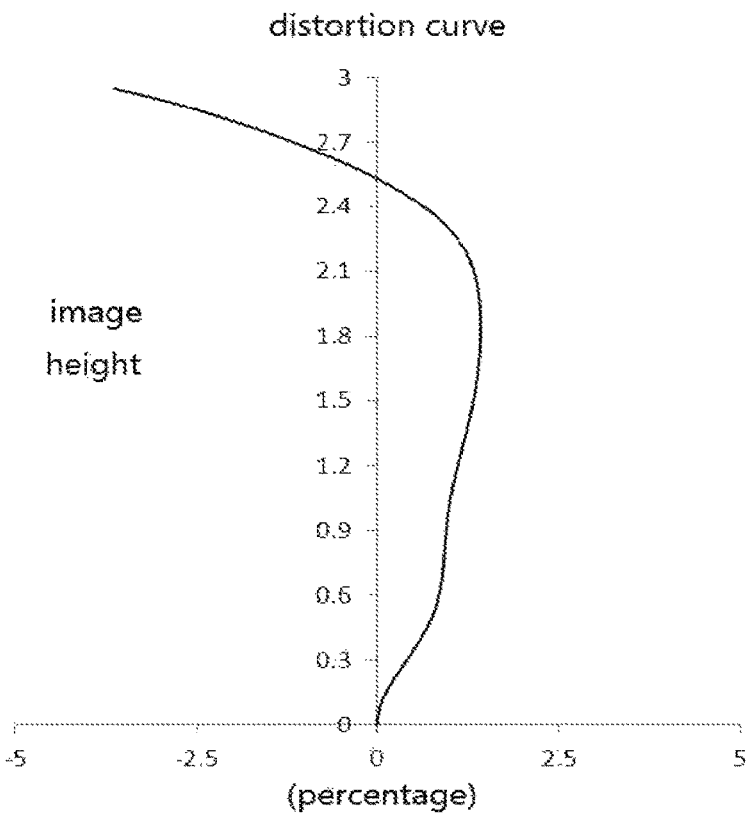
Figure 4D:
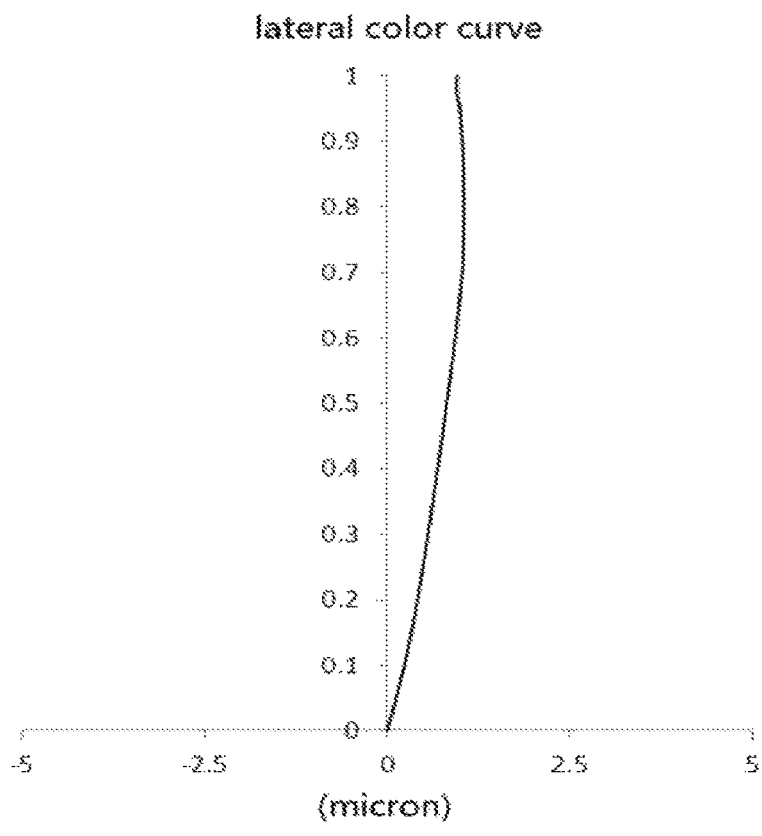

FIG. 4A illustrates the longitudinal aberration curve of the optical imaging lens according to embodiment 2 to represent deviation of the convergence focal point after light with different wavelengths passes through the system. FIG. 4B illustrates an astigmatism curve of the optical imaging lens according to embodiment 2 to represent a meridian image surface curvature and a sagittal image surface curvature. FIG. 4C illustrates a distortion curve of the optical imaging lens according to embodiment 2 to represent distortion values corresponding to different image heights. FIG. 4D illustrates a lateral color curve of the optical imaging lens according to embodiment 2 to represent deviation of different image heights on the imaging surface after the light passes through the system. According to FIG. 4A to FIG. 4D, it can be seen that the optical imaging lens provided in embodiment 2 may achieve high imaging quality.

Embodiment 3

Figure 5:
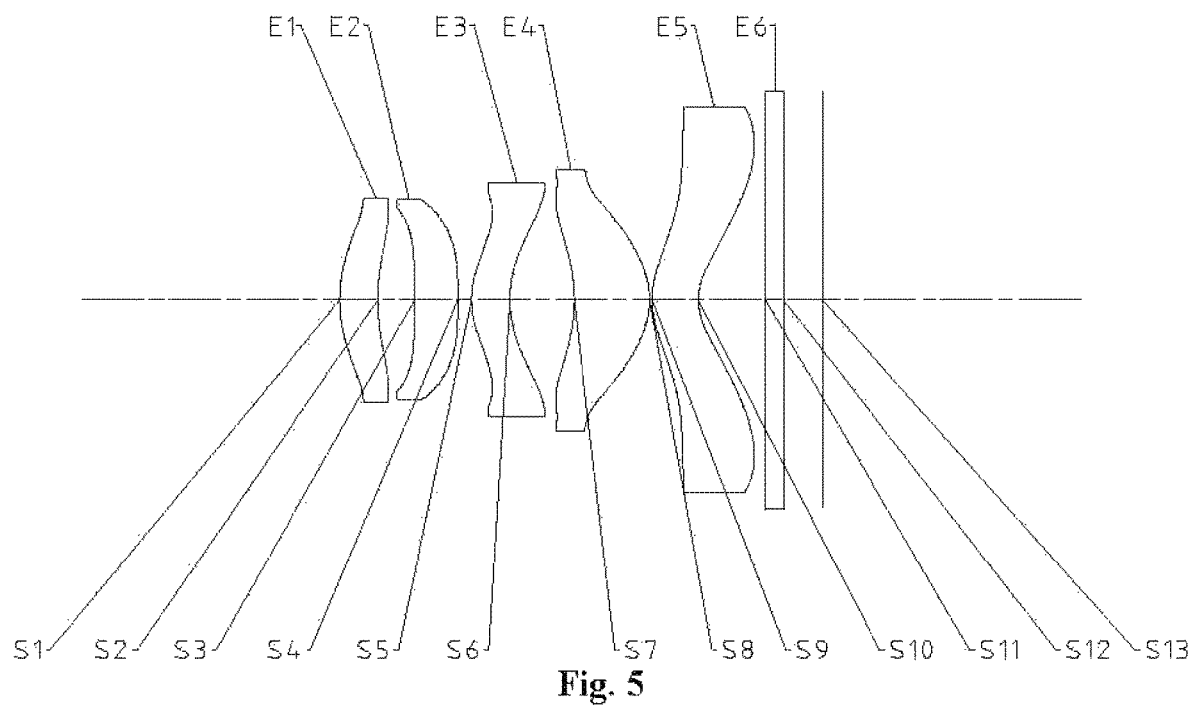
FIG. 5 shows a structure diagram of an optical imaging lens according to embodiment 3 of the application.

The optical imaging lens according to embodiment 3 of the application will be described below with reference to FIG. 5 to FIG. 6D. FIG. 5 is a structure diagram of the optical imaging lens according to embodiment 3 of the application.

As shown in FIG. 5, an optical imaging lens sequentially includes from an object side to an image side along an optical axis: a first lens E1, a diaphragm STO, a second lens E2, a third lens E3, a fourth lens E4, a fifth lens E5 and an optical filter E6.

The lens E1 has a positive focal power, an object-side surface S1 thereof is a convex surface, and an image-side surface S2 is a concave surface. The second lens E2 has a negative focal power, an object-side surface S3 thereof is a concave surface, and an image-side surface S4 is a concave surface. The third lens E3 has a positive focal power, an object-side surface S5 thereof is a convex surface, and an image-side surface S6 is a concave surface. The fourth element E4 has a positive focal power, an object-side surface S7 thereof is a concave surface, and an image-side surface S8 is a convex surface. The fifth lens E5 has a negative focal power, an object-side surface S9 thereof is a convex surface, and an image-side surface S10 is a concave surface. The optical filter E6 has an object-side surface S11 and an image-side surface S12. The optical imaging lens is provided with an imaging surface S13. Light from an object sequentially penetrates through each of the surfaces S1 to S12 and is finally imaged on the imaging surface S13.

In the embodiment 3, the total effective focal length f of the optical imaging lens is 3.50 mm, the on-axis distance TTL from the object-side surface S1 of the first lens E1 to the imaging surface S13 is 5.62 mm, and ImgH is the half of the length of the diagonal line in the effective pixel region on the imaging surface S13, ImgH is 2.95 mm.

Table 5 shows basic parameters of the optical imaging lens of embodiment 3, in which the units of curvature radius, thickness/distance and focal length are millimeter (mm). Table 6 shows high-order coefficients applied to each aspherical mirror surface in embodiment 3. A surface type of each aspherical surface may be defined by formula (1) given in embodiment 1.

TABLE 5

| Surface number | Surface type | Curvature radius | Thickness/ distance | Material | | Focal length | Conic coefficient |
| | | | | Refractive index | Abbe number | | |
|---|---|---|---|---|---|---|---|
| OBJ | Spherical | Infinite | 450.0000 | | | | |
| S1 | Aspherical | 2.5993 | 0.4422 | 1.64 | 20.4 | 11.64 | −8.7369 |
| S2 | Aspherical | 3.7442 | 0.1428 | | | | −12.3296 |
| STO | Spherical | Infinite | 0.2841 | | | | |
| S3 | Aspherical | −86.5868 | 0.5027 | 1.64 | 20.4 | −41.64 | −78.1277 |
| S4 | Aspherical | 38.1677 | 0.1597 | | | | 99.0000 |
| S5 | Aspherical | 1.5117 | 0.4479 | 1.62 | 23.5 | 6.49 | −0.1846 |
| S6 | Aspherical | 2.1526 | 0.7499 | | | | −2.0704 |
| S7 | Aspherical | −2.6191 | 0.8800 | 1.64 | 20.4 | 3.94 | −1.6405 |
| S8 | Aspherical | −1.4470 | 0.0300 | | | | −0.9623 |
| S9 | Aspherical | 1.5863 | 0.5388 | 1.62 | 23.5 | −6.68 | −2.0935 |
| S10 | Aspherical | 0.9969 | 0.7814 | | | | −3.1847 |
| S11 | Spherical | Infinite | 0.2100 | 1.52 | 64.2 | | |
| S12 | Spherical | Infinite | 0.4530 | | | | |
| S13 | Spherical | Infinite | | | | | |

TABLE 6

| Surface number | A4 | A6 | A8 | A10 | A12 | A14 | A16 | A18 | A20 |
|---|---|---|---|---|---|---|---|---|---|
| S1 | 4.6275E−02 | −3.6940E−02 | 2.5720E−02 | −1.8520E−02 | 6.4900E−04 | 9.2970E−03 | −6.9100E−03 | 2.0550E−03 | −2.1000E−04 |
| S2 | 8.4930E−03 | −5.5230E−02 | 1.6629E−01 | −3.7075E−01 | 4.9218E−01 | −4.0578E−01 | 2.0369E−01 | −5.7010E−02 | 6.8470E−03 |
| S3 | −6.8940E−02 | 9.7928E−02 | −2.8925E−01 | 5.3687E−01 | −6.6389E−01 | 5.2713E−01 | −2.5788E−01 | 7.0761E−02 | −8.3400E−03 |
| S4 | −2.6805E−01 | 3.3195E−01 | −4.4908E−01 | 5.0590E−01 | −4.3375E−01 | 2.6032E−01 | −1.0134E−01 | 2.2800E−02 | −2.2500E−03 |
| S5 | −2.1532E−01 | 1.7418E−01 | −2.5192E−01 | 2.4981E−01 | −1.7134E−01 | 7.7308E−02 | −2.2160E−02 | 3.7440E−03 | −2.9000E−04 |
| S6 | 6.9452E−02 | −1.2127E−01 | 8.6959E−02 | −4.2840E−02 | 1.7536E−02 | −7.1000E−03 | 2.4260E−03 | −5.1000E−04 | 4.5300E−05 |
| S7 | 8.0732E−02 | −1.1163E−01 | 1.3241E−01 | −1.1374E−01 | 7.2301E−02 | −2.9450E−02 | 6.8670E−03 | −7.9000E−04 | 3.0200E−05 |
| S8 | 7.0153E−02 | −6.9470E−02 | 6.9425E−02 | −5.8000E−02 | 3.6259E−02 | −1.5350E−02 | 4.2110E−03 | −6.7000E−04 | 4.5200E−05 |
| S9 | −1.1906E−01 | 6.0143E−02 | −2.8250E−02 | 1.1056E−02 | −3.2000E−03 | 6.3900E−04 | −8.2000E−05 | 6.0500E−06 | −1.9000E−07 |
| S10 | −6.3240E−02 | 3.5165E−02 | −1.7760E−02 | 6.7310E−03 | −1.7800E−03 | 3.1200E−04 | −3.5000E−05 | 2.1800E−06 | −5.9000E−08 |

Figure 6A:
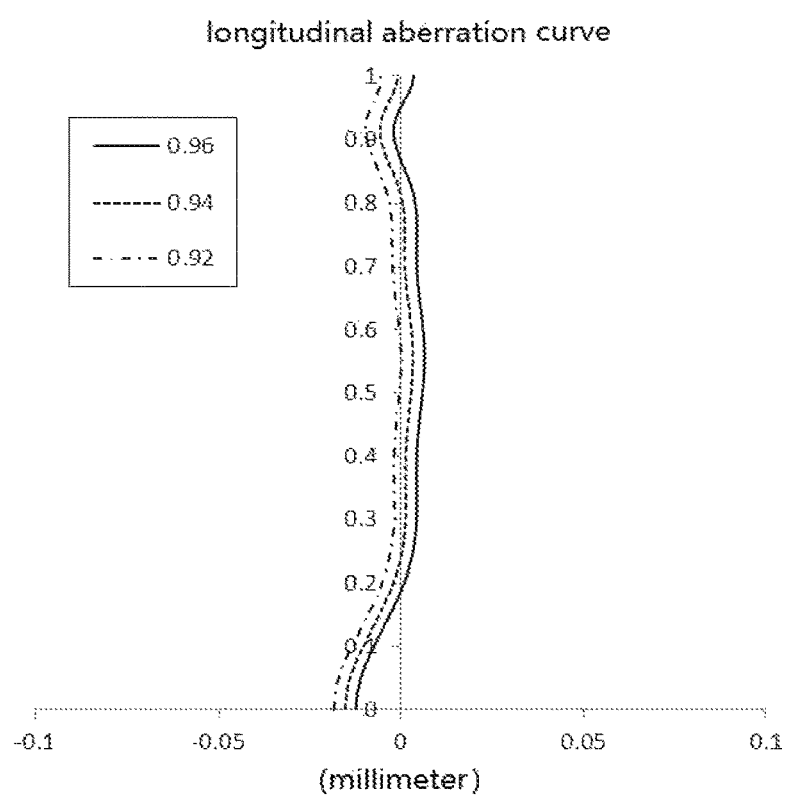
FIG. 6A to FIG. 6D show a longitudinal aberration curve, an astigmatism curve, a distortion curve and a lateral color curve of an optical imaging lens according to embodiment 3 respectively.
Figure 6B:
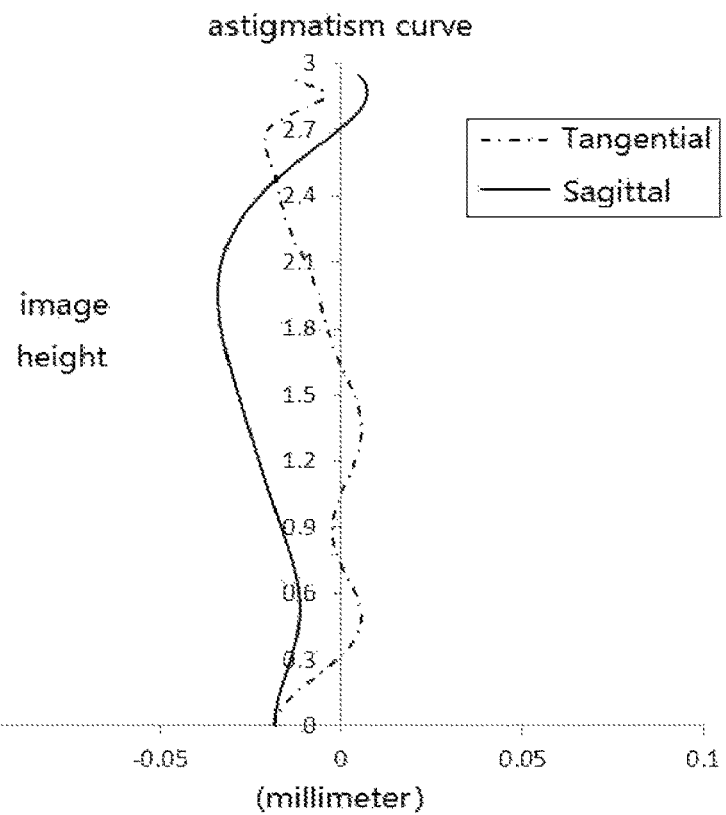
Figure 6C:
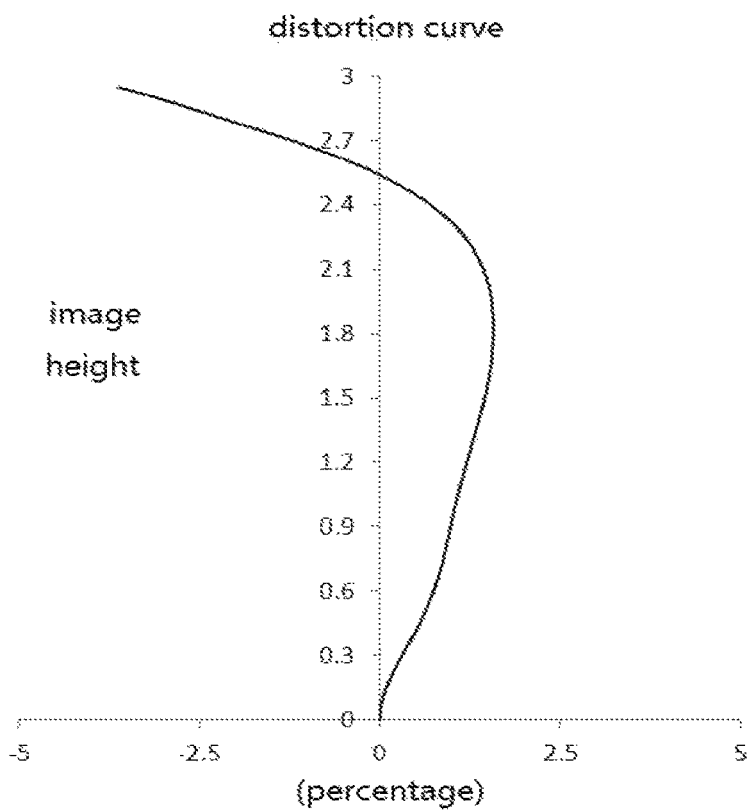
Figure 6D:
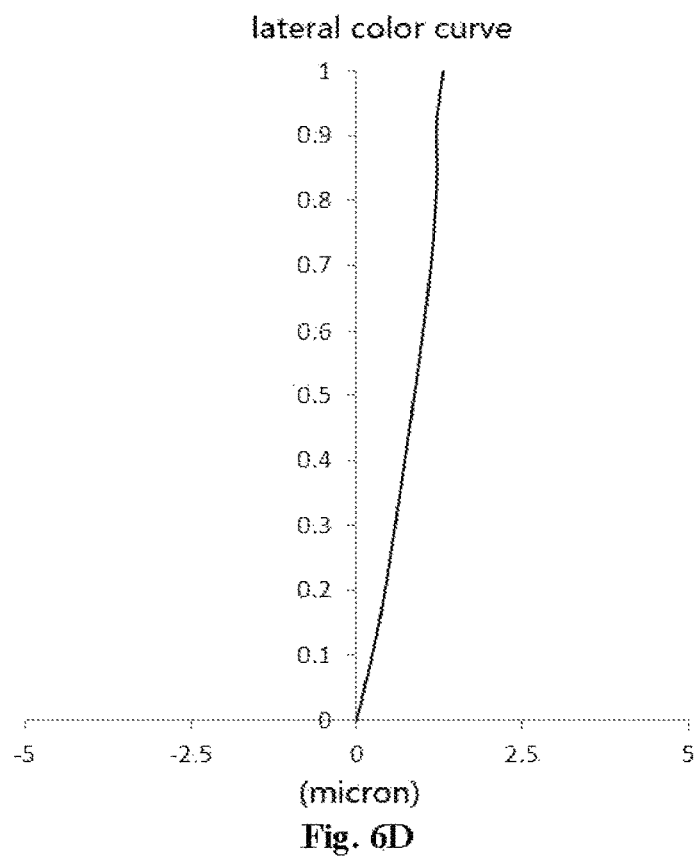

FIG. 6A illustrates the longitudinal aberration curve of the optical imaging lens according to embodiment 3 to represent deviation of the convergence focal point after light with different wavelengths passes through the system. FIG. 6B illustrates an astigmatism curve of the optical imaging lens according to embodiment 3 to represent a meridian image surface curvature and a sagittal image surface curvature. FIG. 6C illustrates a distortion curve of the optical imaging lens according to embodiment 3 to represent distortion values corresponding to different image heights. FIG. 6D illustrates a lateral color curve of the optical imaging lens according to embodiment 3 to represent deviation of different image heights on the imaging surface after the light passes through the system. According to FIG. 6A to FIG. 6D, it can be seen that the optical imaging lens provided in embodiment 3 may achieve high imaging quality.

Embodiment 4

Figure 7:
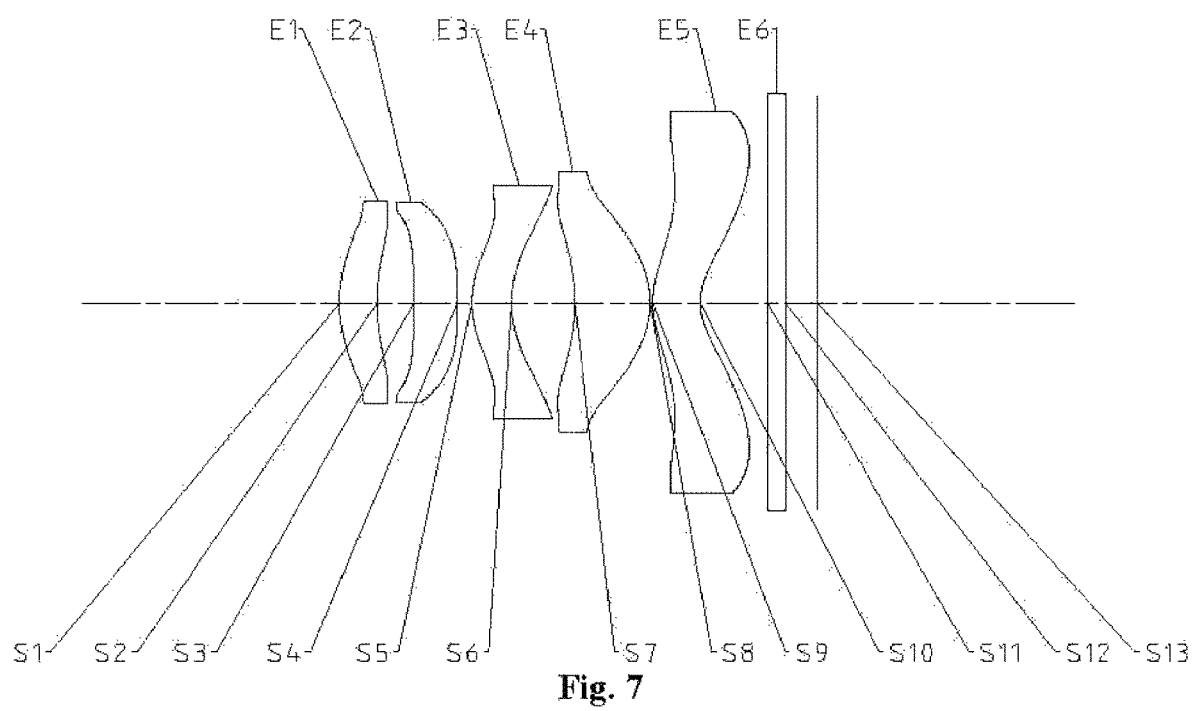
FIG. 7 shows a structure diagram of an optical imaging lens according to embodiment 4 of the application.

The optical imaging lens according to embodiment 4 of the application will be described below with reference to FIG. 7 to FIG. 8D. FIG. 7 is a structure diagram of the optical imaging lens according to embodiment 4 of the application.

As shown in FIG. 7, an optical imaging lens sequentially includes from an object side to an image side along an optical axis: a first lens E1, a diaphragm STO, a second lens E2, a third lens E3, a fourth lens E4, a fifth lens E5 and an optical filter E6.

The lens E1 has a positive focal power, an object-side surface S1 thereof is a convex surface, and an image-side surface S2 is a concave surface. The second lens E2 has a negative focal power, an object-side surface S3 thereof is a concave surface, and an image-side surface S4 is a convex surface. The third lens E3 has a positive focal power, an object-side surface S5 thereof is a convex surface, and an image-side surface S6 is a concave surface. The fourth element E4 has a positive focal power, an object-side surface S7 thereof is a concave surface, and an image-side surface S8 is a convex surface. The fifth lens E5 has a negative focal power, an object-side surface S9 thereof is a convex surface, and an image-side surface S10 is a concave surface. The optical filter E6 has an object-side surface S11 and an image-side surface S12. The optical imaging lens is provided with an imaging surface S13. Light from an object sequentially penetrates through each of the surfaces S1 to S12 and is finally imaged on the imaging surface S13.

In the embodiment 4, the total effective focal length f of the optical imaging lens is 3.49 mm, the on-axis distance TTL from the object-side surface S1 of the first lens E1 to the imaging surface S13 is 5.56 mm, and ImgH is the half of the length of the diagonal line in the effective pixel region on the imaging surface S13, ImgH is 2.95 mm.

Table 7 shows basic parameters of the optical imaging lens of embodiment 4, in which the units of curvature radius, thickness/distance and focal length are millimeter (mm). Table 8 shows high-order coefficients applied to each aspherical mirror surface in embodiment 4. A surface type of each aspherical surface may be defined by formula (1) given in embodiment 1.

TABLE 7

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinite | 450.0000 | | | | |
| S1 | Aspherical | 2.5086 | 0.4350 | 1.64 | 20.4 | 11.65 | −8.5607 |
| S2 | Aspherical | 3.5402 | 0.1500 | | | | −11.3509 |
| STO | Spherical | Infinite | 0.2779 | | | | |
| S3 | Aspherical | −80.4907 | 0.5053 | 1.64 | 20.4 | −153.62 | −99.0000 |
| S4 | Aspherical | −460.8560 | 0.1683 | | | | −99.0000 |
| S5 | Aspherical | 1.5280 | 0.4658 | 1.62 | 23.5 | 6.96 | −0.1464 |
| S6 | Aspherical | 2.0951 | 0.7356 | | | | −1.9535 |
| S7 | Aspherical | −2.8874 | 0.8800 | 1.64 | 20.4 | 4.00 | −1.3844 |
| S8 | Aspherical | −1.5110 | 0.0300 | | | | −0.9523 |
| S9 | Aspherical | 1.7012 | 0.5526 | 1.62 | 23.5 | −6.24 | −2.8576 |
| S10 | Aspherical | 1.0340 | 0.7813 | | | | −3.2582 |
| S11 | Spherical | Infinite | 0.2100 | 1.52 | 64.2 | | |
| S12 | Spherical | Infinite | 0.3716 | | | | |
| S13 | Spherical | Infinite | | | | | |

TABLE 8

| Surface number | A4 | A6 | A8 | A10 | A12 | A14 | A16 | A18 | A20 |
|---|---|---|---|---|---|---|---|---|---|
| S1 | 5.0672E−02 | −3.8540E−02 | 2.1669E−02 | −1.2700E−02 | −2.8300E−03 | 9.7400E−03 | −6.5700E−03 | 1.9310E−03 | −2.0000E−04 |
| S2 | 1.3593E−02 | −6.7360E−02 | 2.0412E−01 | −4.5734E−01 | 6.1354E−01 | −5.1132E−01 | 2.5875E−01 | −7.2720E−02 | 8.7290E−03 |
| S3 | −6.5660E−02 | 9.7599E−02 | −2.9712E−01 | 5.6019E−01 | −6.9888E−01 | 5.5786E−01 | −2.7393E−01 | 7.5480E−02 | −8.9400E−03 |
| S4 | −2.4818E−01 | 3.0010E−01 | −3.8261E−01 | 3.9959E−01 | −3.2137E−01 | 1.8472E−01 | −7.0210E−02 | 1.5668E−02 | −1.5500E−03 |
| S5 | −2.0919E−01 | 1.7592E−01 | −2.5159E−01 | 2.6063E−01 | −1.9428E−01 | 9.8498E−02 | −3.2530E−02 | 6.3550E−03 | −5.6000E−04 |
| S6 | 5.9543E−02 | −1.1200E−01 | 9.7713E−02 | −6.6990E−02 | 3.8638E−02 | −1.7770E−02 | 5.6790E−03 | −1.0700E−03 | 8.6900E−05 |
| S7 | 7.7883E−02 | −1.0142E−01 | 1.1370E−01 | −9.4850E−02 | 5.9441E−02 | −2.3870E−02 | 5.4660E−03 | −6.2000E−04 | 2.2600E−05 |
| S8 | 6.5845E−02 | −5.7050E−02 | 4.4676E−02 | −2.6890E−02 | 1.1937E−02 | −3.4900E−03 | 7.1900E−04 | −1.0000E−04 | 7.1500E−06 |
| S9 | −1.0735E−01 | 4.9289E−02 | −2.3530E−02 | 1.0390E−02 | −3.4600E−03 | 7.9100E−04 | −1.2000E−04 | 9.6000E−06 | −3.4000E−07 |
| S10 | −6.8250E−02 | 3.5061E−02 | −1.6860E−02 | 6.3180E−03 | −1.6900E−03 | 3.0300E−04 | −3.4000E−05 | 2.2200E−06 | −6.2000E−08 |

Figure 8A:
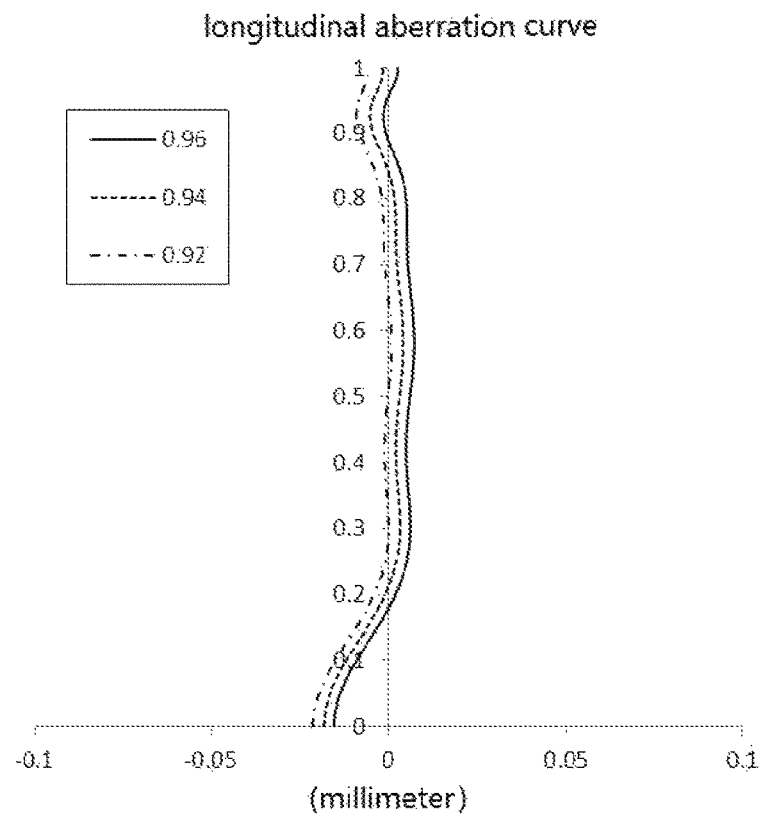
FIG. 8A to FIG. 8D show a longitudinal aberration curve, an astigmatism curve, a distortion curve and a lateral color curve of an optical imaging lens according to embodiment 4 respectively.
Figure 8B:
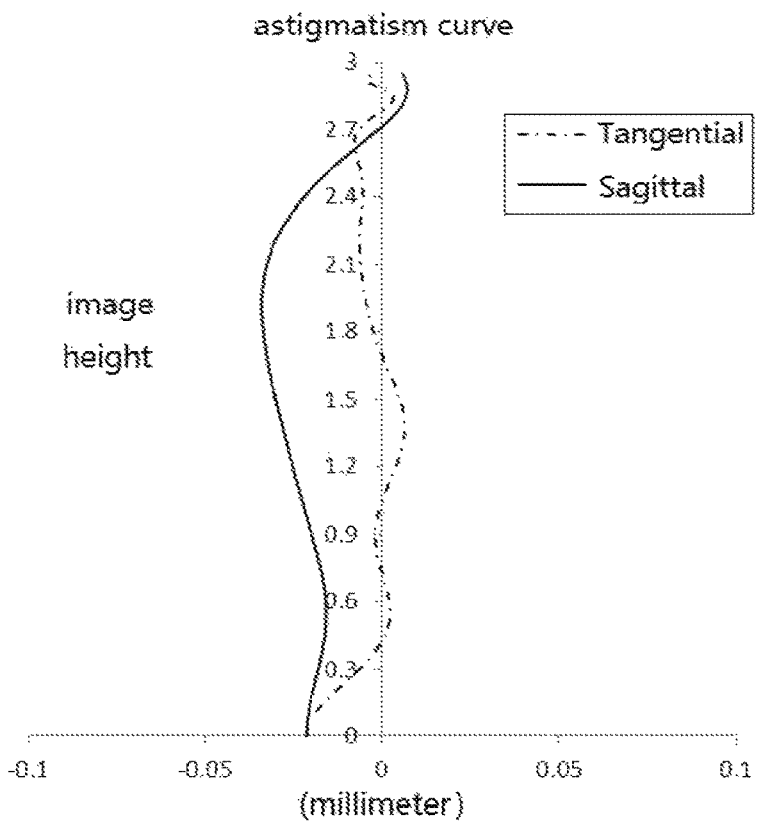
Figure 8C:
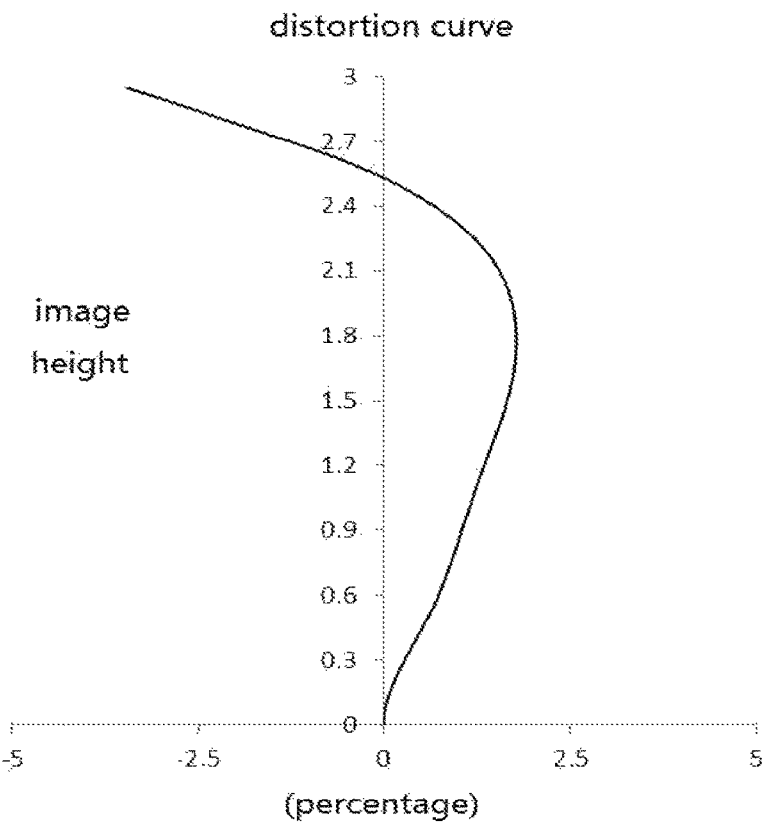
Figure 8D:
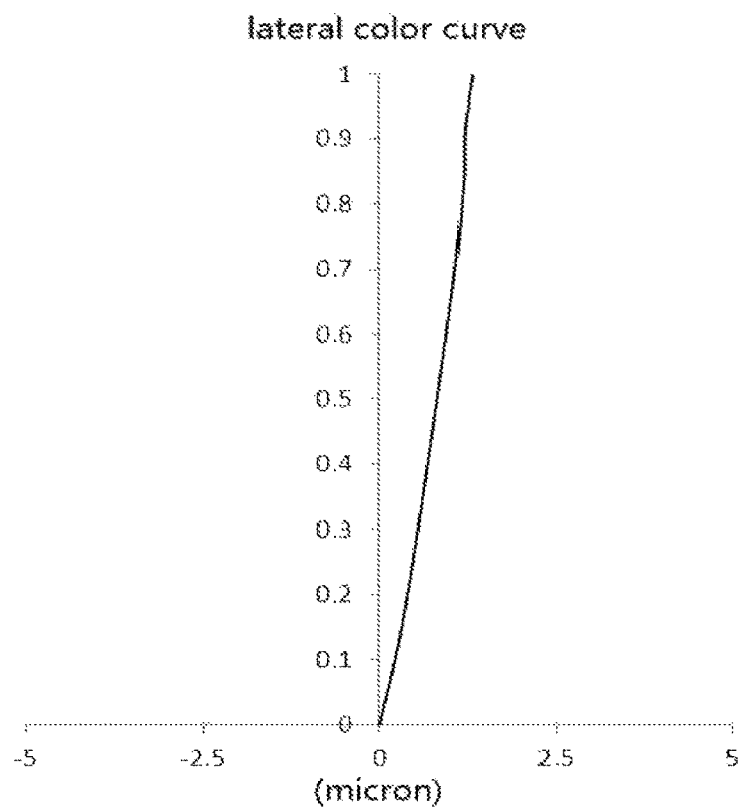

FIG. 8A illustrates the longitudinal aberration curve of the optical imaging lens according to embodiment 4 to represent deviation of the convergence focal point after light with different wavelengths passes through the system. FIG. 8B illustrates an astigmatism curve of the optical imaging lens according to embodiment 4 to represent a meridian image surface curvature and a sagittal image surface curvature. FIG. 8C illustrates a distortion curve of the optical imaging lens according to embodiment 4 to represent distortion values corresponding to different image heights. FIG. 8D illustrates a lateral color curve of the optical imaging lens according to embodiment 4 to represent deviation of different image heights on the imaging surface after the light passes through the system. According to FIG. 8A to FIG. 8D, it can be seen that the optical imaging lens provided in embodiment 4 may achieve high imaging quality.

Embodiment 5

Figure 9:
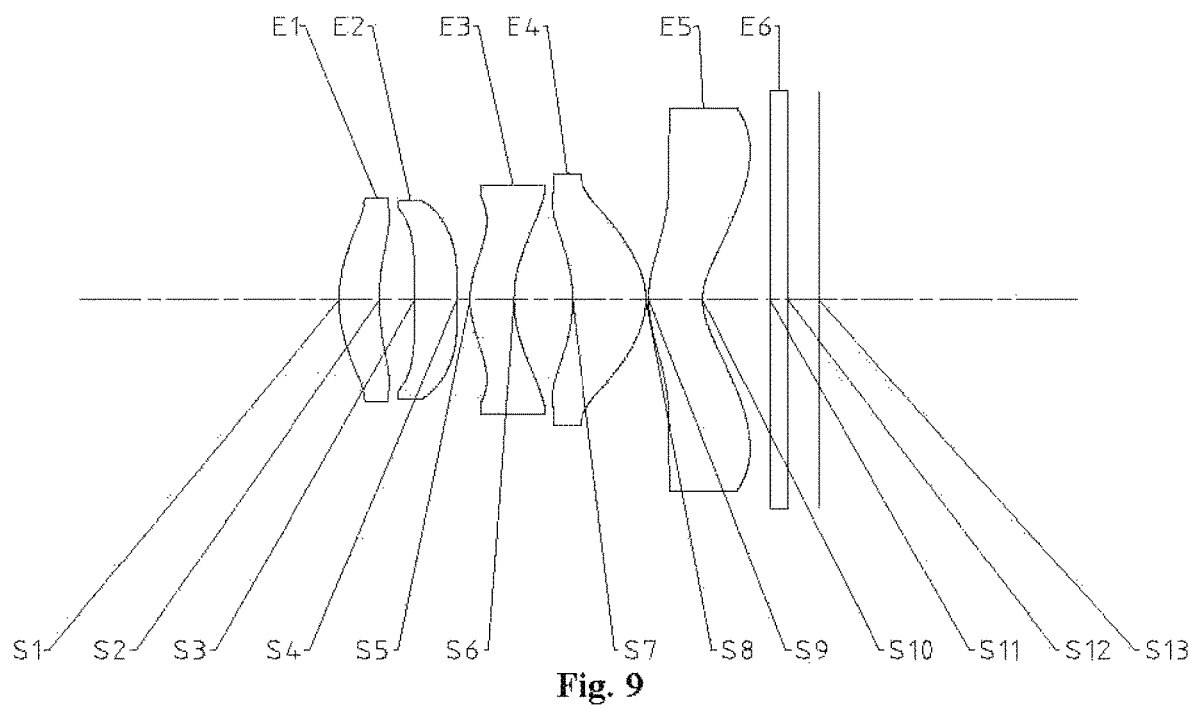
FIG. 9 shows a structure diagram of an optical imaging lens according to embodiment 5 of the application.

The optical imaging lens according to embodiment 5 of the application will be described below with reference to FIG. 9 to FIG. 10D. FIG. 9 is a structure diagram of the optical imaging lens according to embodiment 5 of the application.

As shown in FIG. 9, an optical imaging lens sequentially includes from an object side to an image side along an optical axis: a first lens E1, a diaphragm STO, a second lens E2, a third lens E3, a fourth lens E4, a fifth lens E5 and an optical filter E6.

The lens E1 has a positive focal power, an object-side surface S1 thereof is a convex surface, and an image-side surface S2 is a concave surface. The second lens E2 has a negative focal power, an object-side surface S3 thereof is a convex surface, and an image-side surface S4 is a concave surface. The third lens E3 has a positive focal power, an object-side surface S5 thereof is a convex surface, and an image-side surface S6 is a concave surface. The fourth element E4 has a positive focal power, an object-side surface S7 thereof is a concave surface, and an image-side surface S8 is a convex surface. The fifth lens E5 has a negative focal power, an object-side surface S9 thereof is a convex surface, and an image-side surface S10 is a concave surface. The optical filter E6 has an object-side surface 511 and an image-side surface S12. The optical imaging lens is provided with an imaging surface S13. Light from an object sequentially penetrates through each of the surfaces S1 to S12 and is finally imaged on the imaging surface S13.

In the embodiment 5, the total effective focal length f of the optical imaging lens is 3.49 mm, the on-axis distance TTL from the object-side surface S1 of the first lens E1 to the imaging surface S13 is 5.58 mm, and ImgH is the half of the length of the diagonal line in the effective pixel region on the imaging surface S13, ImgH is 2.95 mm.

Table 9 shows basic parameters of the optical imaging lens of embodiment 5, in which the units of curvature radius, thickness/distance and focal length are millimeter (mm). Table 10 shows high-order coefficients applied to each aspherical mirror surface in embodiment 5. A surface type of each aspherical surface may be defined by formula (1) given in embodiment 1.

TABLE 9

| Surface number | Surface type | Curvature radius | Thickness/ distance | Material | | Focal length | Conic coefficient |
|---|---|---|---|---|---|---|---|
| | | | | Refractive index | Abbe number | | |
| OBJ | Spherical | Infinite | 450.0000 | | | | |
| S1 | Aspherical | 2.4971 | 0.4666 | 1.62 | 23.5 | 10.34 | −7.5445 |
| S2 | Aspherical | 3.8105 | 0.1384 | | | | −11.8685 |
| STO | Spherical | Infinite | 0.2690 | | | | |
| S3 | Aspherical | 70.4148 | 0.4926 | 1.64 | 20.4 | −18.33 | −40.6302 |
| S4 | Aspherical | 9.9628 | 0.1535 | | | | −99.0000 |
| S5 | Aspherical | 1.5280 | 0.5131 | 1.62 | 23.5 | 5.43 | −0.1430 |
| S6 | Aspherical | 2.4500 | 0.6815 | | | | −1.9905 |
| S7 | Aspherical | −2.3398 | 0.8568 | 1.64 | 20.4 | 3.33 | −1.8901 |
| S8 | Aspherical | −1.2683 | 0.0300 | | | | −1.0718 |
| S9 | Aspherical | 2.0961 | 0.6291 | 1.62 | 23.5 | −4.62 | −1.6892 |
| S10 | Aspherical | 1.0693 | 0.7815 | | | | −4.5445 |
| S11 | Spherical | Infinite | 0.2100 | 1.52 | 64.2 | | |
| S12 | Spherical | Infinite | 0.3580 | | | | |
| S13 | Spherical | Infinite | | | | | |

TABLE 10

| Surface number | A4 | A6 | A8 | A10 | A12 | A14 | A16 | A18 | A20 |
|---|---|---|---|---|---|---|---|---|---|
| S1 | 4.5178E−02 | −1.6320E−02 | −3.3260E−02 | 9.0874E−02 | −1.2655E−01 | 1.0041E−01 | −4.5990E−02 | 1.1181E−02 | −1.1000E−03 |
| S2 | 8.2800E−03 | −5.5570E−02 | 1.9102E−01 | −4.5577E−01 | 6.3376E−01 | −5.4388E−01 | 2.8293E−01 | −8.1800E−02 | 1.0120E−02 |
| S3 | −7.6350E−02 | 1.0963E−01 | −3.0231E−01 | 5.4168E−01 | −6.6230E−01 | 5.2631E−01 | −2.5937E−01 | 7.2026E−02 | −8.6100E−03 |
| S4 | −2.9219E−01 | 3.5760E−01 | −4.9517E−01 | 5.8411E−01 | −5.2327E−01 | 3.2637E−01 | −1.3154E−01 | 3.0571E−02 | −3.1100E−03 |
| S5 | −2.4186E−01 | 1.9646E−01 | −3.1064E−01 | 3.3219E−01 | −2.3595E−01 | 1.0783E−01 | −3.1070E−02 | 5.3020E−03 | −4.3000E−04 |
| S6 | 7.4792E−02 | −1.1772E−01 | 5.0245E−02 | 1.1207E−02 | −2.0280E−02 | 7.6210E−03 | −7.6000E−04 | −1.8000E−04 | 3.4900E−05 |
| S7 | 6.7433E−02 | −6.5460E−02 | 7.1394E−02 | −7.3240E−02 | 6.1037E−02 | −3.0090E−02 | 7.9340E−03 | −9.9000E−04 | 3.8900E−05 |
| S8 | 1.2846E−01 | −1.7891E−01 | 2.2367E−01 | −2.1253E−01 | 1.3911E−01 | −5.9650E−02 | 1.6134E−02 | −2.4900E−03 | 1.6500E−04 |
| S9 | −9.9320E−02 | 4.7122E−02 | −2.8380E−02 | 1.4388E−02 | −4.9000E−03 | 1.0710E−03 | −1.4000E−04 | 1.0900E−05 | −3.5000E−07 |
| S10 | −2.9230E−02 | 1.1051E−02 | −7.5800E−03 | 3.8580E−03 | −1.2100E−03 | 2.3100E−04 | −2.7000E−05 | 1.6900E−06 | −4.6000E−08 |

Figure 10A:
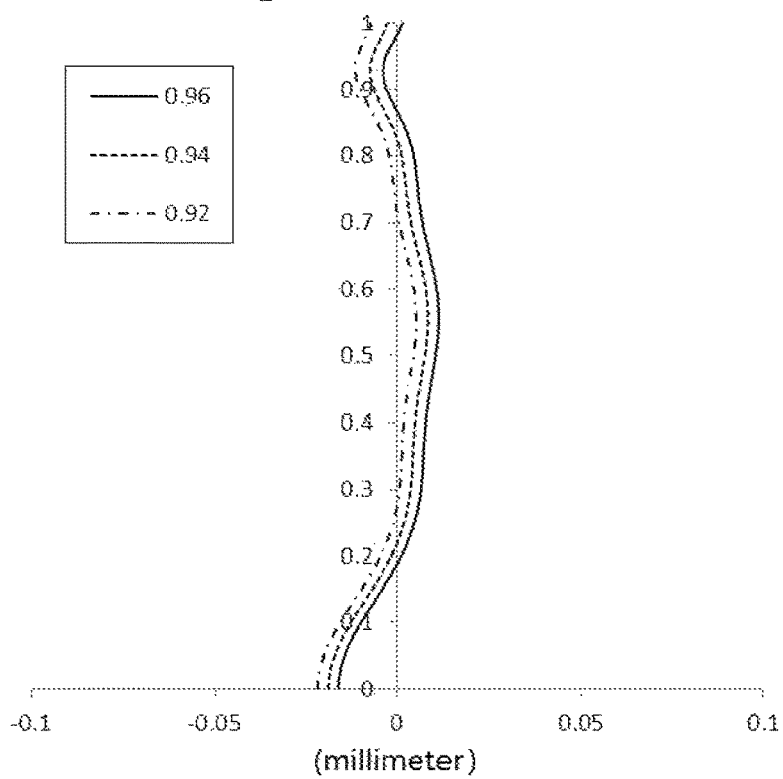
FIG. 10A to FIG. 10D show a longitudinal aberration curve, an astigmatism curve, a distortion curve and a lateral color curve of an optical imaging lens according to embodiment 5 respectively.
Figure 10B:
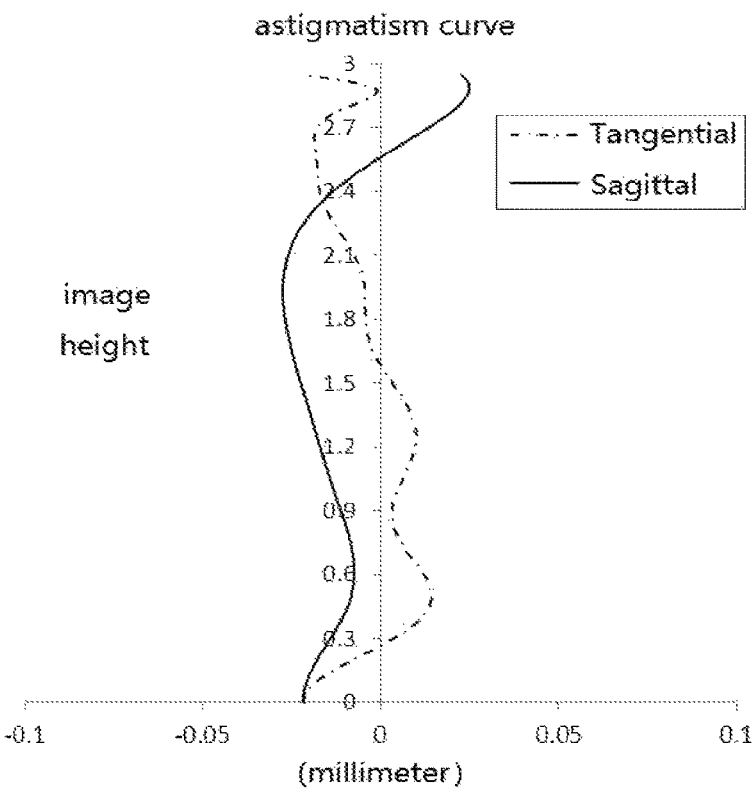
Figure 10C:
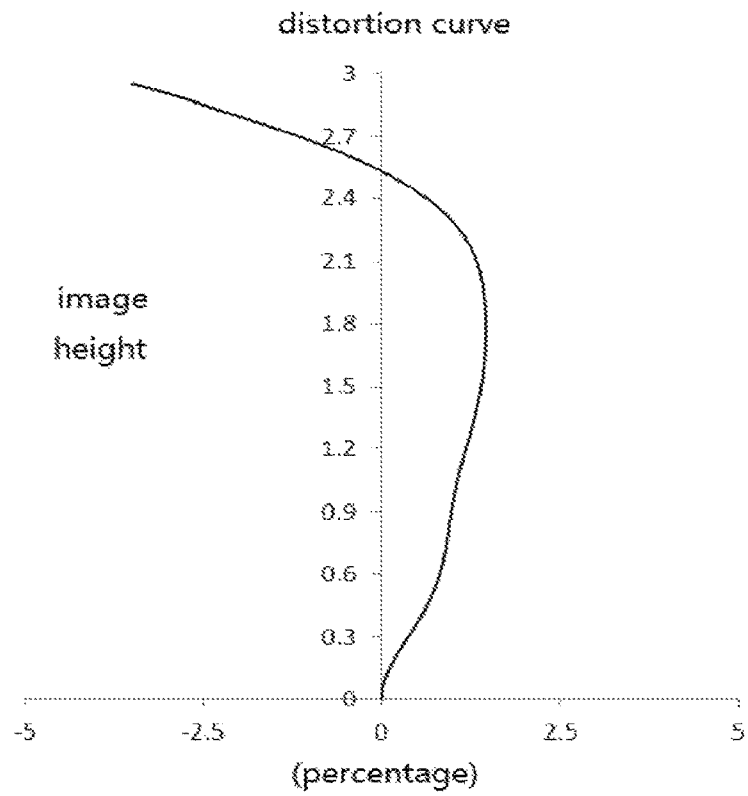
Figure 10D:
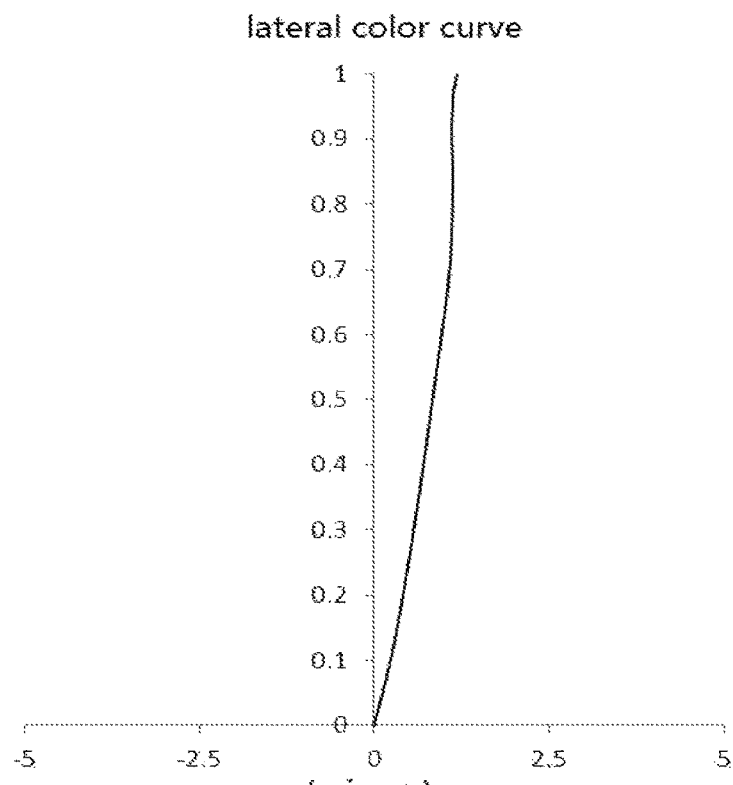

FIG. 10A illustrates the longitudinal aberration curve of the optical imaging lens according to embodiment 5 to represent deviation of the convergence focal point after light with different wavelengths passes through the system. FIG. 10B illustrates an astigmatism curve of the optical imaging lens according to embodiment 5 to represent a meridian image surface curvature and a sagittal image surface curvature. FIG. 10C illustrates a distortion curve of the optical imaging lens according to embodiment 5 to represent distortion values corresponding to different image heights. FIG. 10D illustrates a lateral color curve of the optical imaging lens according to embodiment 5 to represent deviation of different image heights on the imaging surface after the light passes through the system. According to FIG. 10A to FIG. 10D, it can be seen that the optical imaging lens provided in embodiment 5 may achieve high imaging quality.

Embodiment 6

Figure 11:
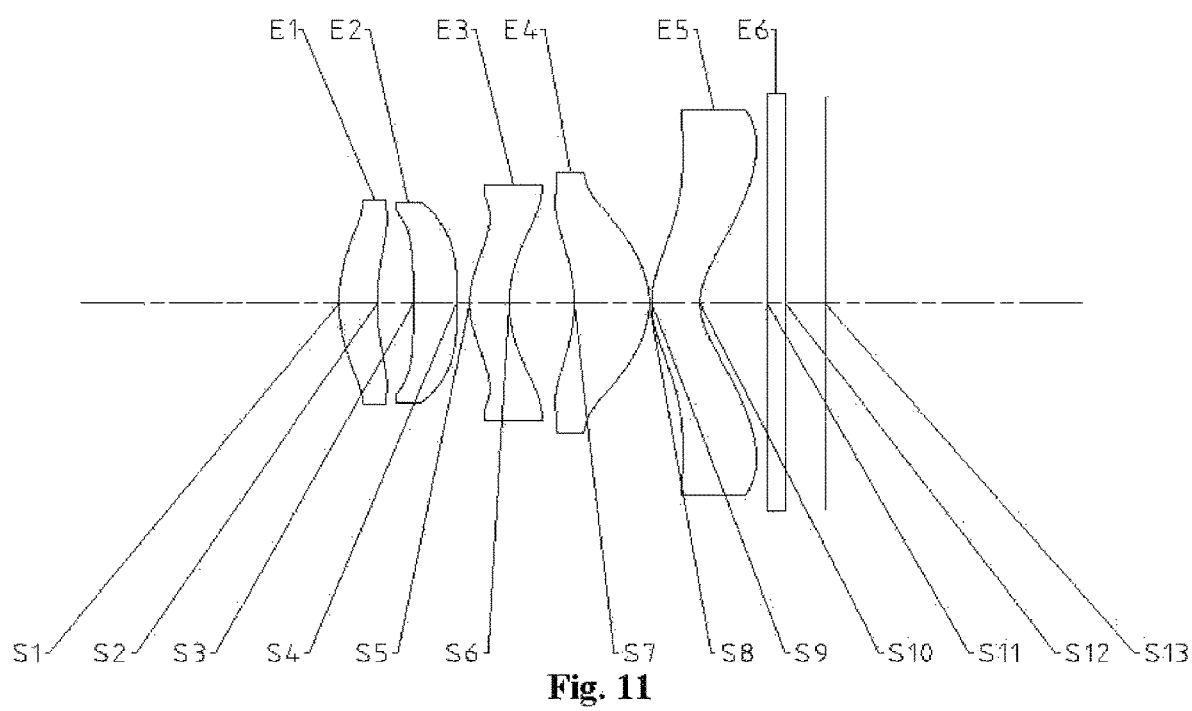
FIG. 11 shows a structure diagram of an optical imaging lens according to embodiment 6 of the application.

The optical imaging lens according to embodiment 6 of the application will be described below with reference to FIG. 11 to FIG. 12D. FIG. 11 is a structure diagram of the optical imaging lens according to embodiment 6 of the application.

As shown in FIG. 11, the optical imaging lens sequentially includes from an object side to an image side along an optical axis: a first lens E1, a diaphragm STO, a second lens E2, a third lens E3, a fourth lens E4, a fifth lens E5 and an optical filter E6.

The lens E1 has a positive focal power, an object-side surface S1 thereof is a convex surface, and an image-side surface S2 is a concave surface. The second lens E2 has a negative focal power, an object-side surface S3 thereof is a concave surface, and an image-side surface S4 is a concave surface. The third lens E3 has a positive focal power, an object-side surface S5 thereof is a convex surface, and an image-side surface S6 is a concave surface. The fourth element E4 has a positive focal power, an object-side surface S7 thereof is a concave surface, and an image-side surface S8 is a convex surface. The fifth lens E5 has a negative focal power, an object-side surface S9 thereof is a convex surface, and an image-side surface S10 is a concave surface. The optical filter E6 has an object-side surface S11 and an image-side surface S12. The optical imaging lens is provided with an imaging surface S13. Light from an object sequentially penetrates through each of the surfaces S1 to S12 and is finally imaged on the imaging surface S13.

In the embodiment 6, the total effective focal length f of the optical imaging lens is 3.50 mm, the on-axis distance TTL from the object-side surface S1 of the first lens E1 to the imaging surface S13 is 5.66 mm, and ImgH is the half of the length of the diagonal line in the effective pixel region on the imaging surface S13, ImgH is 2.95 mm.

Table 11 shows basic parameters of the optical imaging lens of embodiment 6, in which the units of curvature radius, thickness/distance and focal length are millimeter (mm). Table 12 shows high-order coefficients applied to each aspherical mirror surface in embodiment 6. A surface type of each aspherical surface may be defined by formula (1) given in embodiment 1.

TABLE 11

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinite | 450.0000 | | | | |
| S1 | Aspherical | 2.5864 | 0.4450 | 1.62 | 23.5 | 11.88 | −8.5936 |
| S2 | Aspherical | 3.7340 | 0.1400 | | | | −12.3954 |
| STO | Spherical | Infinite | 0.2806 | | | | |
| S3 | Aspherical | −256.8670 | 0.5000 | 1.64 | 20.4 | −25.54 | 99.0000 |
| S4 | Aspherical | 17.3264 | 0.1531 | | | | −32.3320 |
| S5 | Aspherical | 1.5014 | 0.4607 | 1.62 | 23.5 | 5.86 | −0.1869 |
| S6 | Aspherical | 2.2654 | 0.7552 | | | | −2.0071 |
| S7 | Aspherical | −2.5292 | 0.8800 | 1.64 | 20.4 | 4.00 | −1.7800 |
| S8 | Aspherical | −1.4381 | 0.0300 | | | | −0.9694 |
| S9 | Aspherical | 1.6232 | 0.5593 | 1.62 | 23.5 | −6.95 | −2.1865 |
| S10 | Aspherical | 1.0225 | 0.7814 | | | | −3.2349 |
| S11 | Spherical | Infinite | 0.2100 | 1.52 | 64.2 | | |
| S12 | Spherical | Infinite | 0.4602 | | | | |
| S13 | Spherical | Infinite | | | | | |

TABLE 12

| Surface number | A4 | A6 | A8 | A10 | A12 | A14 | A16 | A18 | A20 |
|---|---|---|---|---|---|---|---|---|---|
| S1 | 4.6318E-02 | -3.7370E-02 | 2.9842E-02 | -2.7470E-02 | 1.0276E-02 | 3.3860E-03 | -4.8500E-03 | 1.6730E-03 | -1.9000E-04 |
| S2 | 8.3910E-03 | -5.6670E-02 | 1.7534E-01 | -3.9290E-01 | 5.2027E-01 | -4.2649E-01 | 2.1243E-01 | -5.8930E-02 | 7.0080E-03 |
| S3 | -7.3890E-02 | 1.1298E-01 | -3.2446E-01 | 5.9592E-01 | -7.3047E-01 | 5.7593E-01 | -2.8021E-01 | 7.6584E-02 | -9.0000E-03 |
| S4 | -2.8922E-01 | 3.6580E-01 | -4.9986E-01 | 5.6616E-01 | -4.8321E-01 | 2.8670E-01 | -1.0994E-01 | 2.4338E-02 | -2.3600E-03 |
| S5 | -2.2754E-01 | 1.8886E-01 | -2.7270E-01 | 2.6810E-01 | -1.8056E-01 | 7.9351E-02 | -2.1990E-02 | 3.5740E-03 | -2.7000E-04 |
| S6 | 7.4486E-02 | -1.2554E-01 | 8.2923E-02 | -3.3210E-02 | 9.1670E-03 | -2.9700E-03 | 1.1940E-03 | -3.0000E-04 | 3.0500E-05 |
| S7 | 8.1003E-02 | -1.0698E-01 | 1.2479E-01 | -1.0715E-01 | 6.9128E-02 | -2.8890E-02 | 7.0150E-03 | -8.7000E-04 | 3.9800E-05 |
| S8 | 7.0821E-02 | -6.9420E-02 | 6.7640E-02 | -5.5890E-02 | 3.5073E-02 | -1.4990E-02 | 4.1540E-03 | -6.6000E-04 | 4.4900E-05 |
| S9 | -1.0256E-01 | 4.8829E-02 | -2.3740E-02 | 1.0128E-02 | -3.2200E-03 | 7.0000E-04 | -9.7000E-05 | 7.6000E-06 | -2.6000E-07 |
| S10 | -5.4840E-02 | 2.9668E-02 | -1.5810E-02 | 6.4020E-03 | -1.7900E-03 | 3.2900E-04 | -3.8000E-05 | 2.4500E-06 | -6.8000E-08 |

Figure 12A:
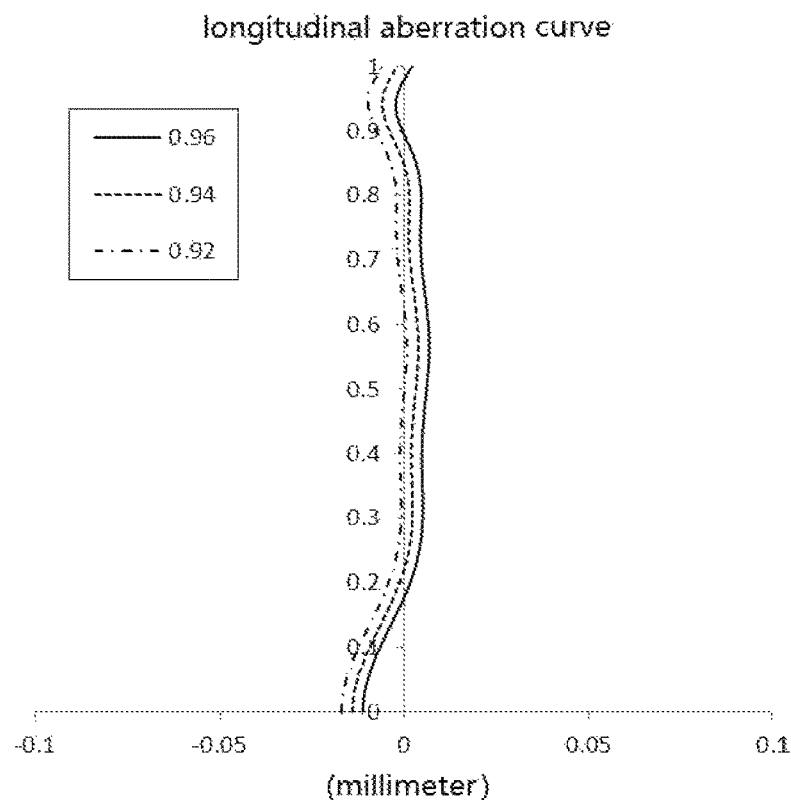
FIG. 12A to FIG. 12D show a longitudinal aberration curve, an astigmatism curve, a distortion curve and a lateral color curve of an optical imaging lens according to embodiment 6 respectively.
Figure 12B:
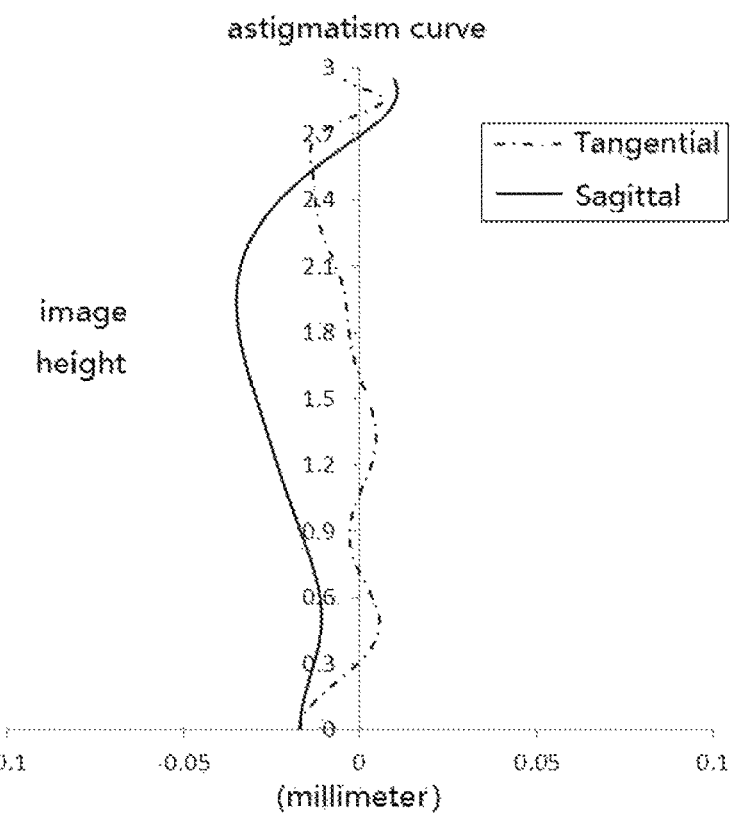
Figure 12C:
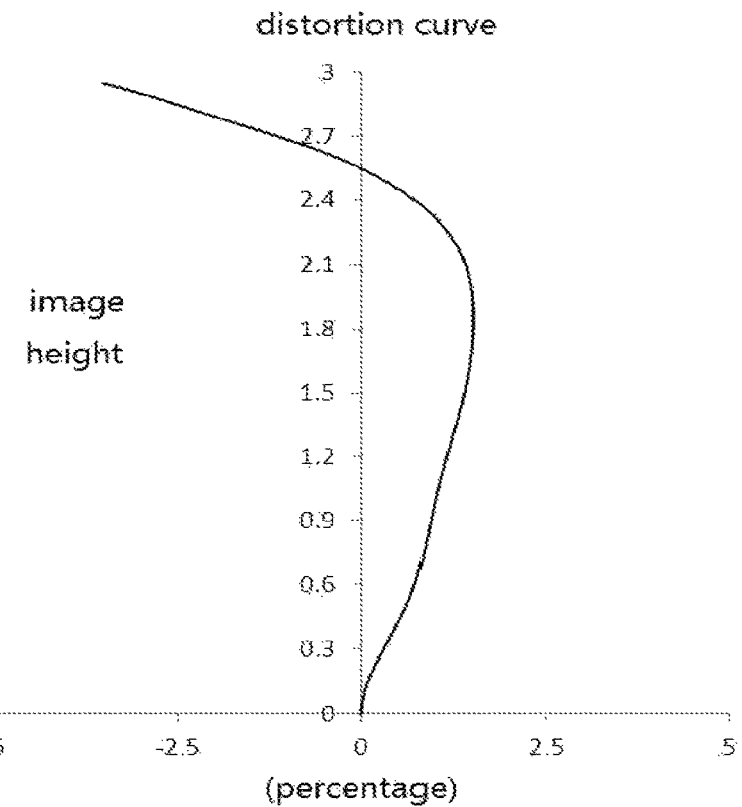
Figure 12D:
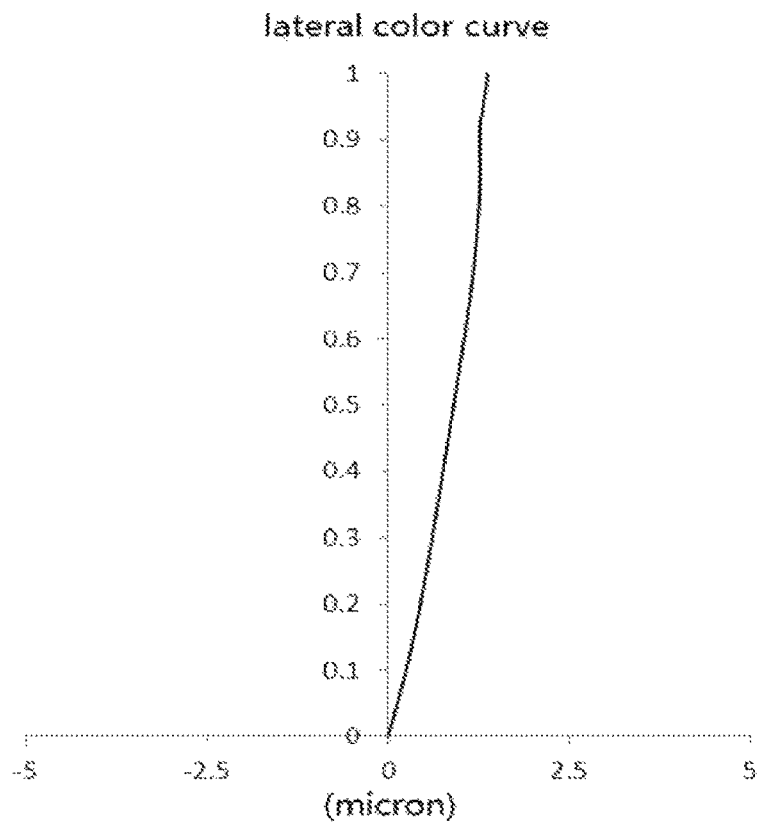

FIG. 12A illustrates the longitudinal aberration curve of the optical imaging lens according to embodiment 6 to represent deviation of the convergence focal point after light with different wavelengths passes through the system. FIG. 12B illustrates an astigmatism curve of the optical imaging lens according to embodiment 6 to represent a meridian image surface curvature and a sagittal image surface curvature. FIG. 12C illustrates a distortion curve of the optical imaging lens according to embodiment 6 to represent distortion values corresponding to different image heights. FIG. 12D illustrates a lateral color curve of the optical imaging lens according to embodiment 6 to represent deviation of different image heights on the imaging surface after the light passes through the system. According to FIG. 12A to FIG. 12D, it can be seen that the optical imaging lens provided in embodiment 6 may achieve high imaging quality.

To sum up, embodiment 1 to embodiment 6 meet the relationship shown in Table 13 respectively.

TABLE 13

| | embodiments | | | | | |
|---|---|---|---|---|---|---|
| Conditional expressions | 1 | 2 | 3 | 4 | 5 | 6 |
| f/EPD | 1.32 | 1.35 | 1.37 | 1.39 | 1.40 | 1.41 |
| ImgH*EPD/f(mm) | 2.23 | 2.19 | 2.15 | 2.12 | 2.11 | 2.09 |
| f1/(f3 + f4) | 0.40 | 1.08 | 1.12 | 1.06 | 1.18 | 1.20 |
| f/(R7 + R8) | -0.96 | -1.03 | -0.86 | -0.79 | -0.97 | -0.88 |
| R9/R10 | 2.12 | 1.91 | 1.59 | 1.65 | 1.96 | 1.59 |
| FOV (°) | 81.4 | 81.9 | 81.8 | 81.7 | 81.8 | 81.8 |
| (CT3 + T34)/(CT4) | 1.19 | 1.37 | 1.36 | 1.37 | 1.39 | 1.38 |
| SL/(CT1 + T12 + CT2) | 3.66 | 3.60 | 3.67 | 3.64 | 3.64 | 3.71 |
| f45/(CT4 + CT5) | 4.67 | 5.52 | 5.11 | 5.66 | 5.49 | 4.96 |
| SAG42/SAG22 | 2.48 | 1.95 | 1.78 | 1.76 | 1.90 | 1.81 |
| DT51/(SAG51 + SAG52) | 5.73 | 3.32 | 2.82 | 4.23 | 3.85 | 2.86 |

The application further provides an infrared sensor, which may include: the above-described optical imaging lens, an infrared transmitter and a photosensitive chip. The infrared transmitter is configured to transmit near-infrared light to an object side, the neat-infrared light having a waveband between 900 nm to 1000 nm. The photosensitive chip is disposed on an imaging surface of the optical imaging lens, and configured to receive reflected light rays based on the near-infrared light from the object side. The photosensitive chip is configured to image, and may be a Charge Coupled Device (CCD) or a Complementary Metal Oxide Semiconductor (CMOS). The infrared sensor may be an independent imaging device of a digital camera, and may also be an imaging module integrated to a mobile electronic device such as a mobile phone. The infrared sensor is further provided with a controller; and the controller controls the infrared transmitter to transmit the near-infrared rays, and receives, through the photosensitive chip, information carried by the reflected light rays, to make calculations to obtain depth information of the object side.

The above description is only description about the preferred embodiments of the application and adopted technical principles. Those skilled in the art should know that the scope of present disclosure involved in the application is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions disclosed in the application.

What is claimed is:

1. An optical imaging lens, sequentially comprising from an object side to an image side along an optical axis:
   a first lens having a focal power;
   a diaphragm;
   a second lens having a focal power;
   a third lens having a focal power, and provided with an object-side surface and an image-side surface, the object-side surface is convex surface, the image-side surface is a concave surface;

a fourth lens having a positive focal power, and provided with an object-side surface and an image-side surface, the object-side surface is a concave surface, the image-side surface is a convex surface; and a fifth lens having a negative focal power, wherein at least one aspherical mirror surface is comprised in an object-side surface of the first lens to an image-side surface of the fifth lens; and the optical imaging lens meets the following relational expressions:

$f/\text{EPD} < 1.5$, and $2 \text{ mm} < \text{ImgH} * \text{EPD}/f < 3 \text{ mm}$, wherein, the f is a total effective focal length of the optical imaging lens, the EPD is an entrance pupil diameter of the optical imaging lens, and the ImgH is a half of a length of a diagonal line of an effective pixel region on an imaging surface of the optical imaging lens.

2. The optical imaging lens as claimed in claim 1, wherein the optical imaging lens further meets a relational expression: $0.3 < f1/(f3+f4) < 1.3$, wherein, the f1 is an effective focal length of the first lens, the f3 is an effective focal length of the third lens, and the f4 is an effective focal length of the fourth lens.

3. The optical imaging lens as claimed in claim 1, wherein the optical imaging lens further meets a relational expression: $-1.1 < f/(R7+R8) < -0.7$, wherein, the R7 is a curvature radius of the object-side surface of the fourth lens, and the R8 is a curvature radius of the image-side surface of the fourth lens.

4. The optical imaging lens as claimed in claim 1, wherein the optical imaging lens further meets a relational expression: $1.5 < R9/R10 < 2.2$, wherein, the R9 is a curvature radius of an object-side surface of the fifth lens, and the R10 is a curvature radius of an image-side surface of the fifth lens.

5. The optical imaging lens as claimed in claim 1, wherein a maximum Field of View (FOV) of the optical imaging lens meets $80° < \text{FOV} < 85°$.

6. The optical imaging lens as claimed in claim 1, wherein the optical imaging lens further meets a relational expression: $1.1 < (CT3+T34)/CT4 < 1.4$, wherein, the CT3 is a central thickness of the third lens on the optical axis, the T34 is a spacing distance on the optical axis between the third lens and the fourth lens, and the CT4 is a central thickness of the fourth lens on the optical axis.

7. The optical imaging lens as claimed in claim 1, wherein the optical imaging lens further meets a relational expression: $3.5 < SL/(CT1+T12+CT2) < 3.8$, wherein, the SL is a spacing distance on the optical axis between the diaphragm and the imaging surface, the CT1 is a central thickness of the first lens on the optical axis, the T12 is a spacing distance on the optical axis between the first lens and the second lens, and the CT2 is a central thickness of the second lens on the optical axis.

8. The optical imaging lens as claimed in claim 1, wherein the optical imaging lens further meets a relational expression: $4.6 < f45/(CT4+CT5) < 5.7$, wherein, the f45 is a synthetic focal length for the fourth lens and the fifth lens, the CT4 is a central thickness of the fourth lens on the optical axis, and the CT5 is a central thickness of the fifth lens on the optical axis.

9. The optical imaging lens as claimed in claim 1, wherein the optical imaging lens further meets a relational expression: $1.7 < SAG42/SAG22 < 2.5$, wherein the SAG42 is an on-axis distance from an intersection between the image-side surface of the fourth lens and the optical axis to an effective radius vertex of the image-side surface of the fourth lens, and the SAG22 is an on-axis distance from an intersection between the image-side surface of the second lens and the optical axis to an effective radius vertex of the image-side surface of the second lens.

10. The optical imaging lens as claimed in claim 1, wherein the optical imaging lens further meets a relational expression: $2.8 < DT51/(SAG51+SAG52) < 5.8$, wherein, the DT51 is an effective semi-diameter of the object-side surface of the fifth lens, the SAG51 is an on-axis distance from an intersection between the object-side surface of the fifth lens and the optical axis to an effective radius vertex of the object-side surface of the fifth lens, and the SAG52 is an on-axis distance from an intersection between the image-side surface of the fifth lens and the optical axis to an effective radius vertex of the image-side surface of the fifth lens.

11. The optical imaging lens as claimed in claim 1, wherein the optical imaging lens has a working waveband of 900 nm to 1000 nm.

12. An optical imaging lens, sequentially comprising from an object side to an image side along an optical axis:
    a first lens having a focal power;
    a diaphragm;
    a second lens having a focal power;
    a third lens having a focal power, and provided with an object-side surface and an image-side surface, the object-side surface is convex surface and a concave surface;
    a fourth lens having a positive focal power, and provided with an object-side surface and an image-side surface, the object-side surface is a concave surface, the image-side surface is a convex surface; and
    a fifth lens having a negative focal power,
    wherein at least one aspherical mirror surface is comprised in an object-side surface of the first lens to an image-side surface of the fifth lens; and
    the optical imaging lens meets the following relational expressions:

$2 \text{ mm} < \text{ImgH} * \text{EPD}/f < 3 \text{ mm}$, and $80° < \text{FOV} < 85°$, wherein, the f is a total effective focal length of the optical imaging lens, the EPD is an entrance pupil diameter of the optical imaging lens, the ImgH is a half of a length of a diagonal line of an effective pixel region on an imaging surface of the optical imaging lens, and the Field of View (FOV) is a maximum FOV of the optical imaging lens.

13. The optical imaging lens as claimed in claim 12, wherein the optical imaging lens further meets a relational expression:
    $0.3 < f1/(f3+f4) < 1.3$, wherein, the f1 is an effective focal length of the first lens, the f3 is an effective focal length of the third lens, and the f4 is an effective focal length of the fourth lens.

14. The optical imaging lens as claimed in claim 12, wherein the optical imaging lens further meets a relational expression:
    $-1.1 < f/(R7+R8) < -0.7$, wherein, the R7 is a curvature radius of the object-side surface of the fourth lens, and the R8 is a curvature radius of the image-side surface of the fourth lens.

15. The optical imaging lens as claimed in claim 14, wherein the optical imaging lens further meets a relational expression:

$f/EPD<1.5$.

16. The optical imaging lens as claimed in claim 12, wherein the optical imaging lens further meets a relational expression:

1.5<R9/R10<2.2, wherein, the R9 is a curvature radius of an object-side surface of the fifth lens, and the R10 is a curvature radius of an image-side surface of the fifth lens.

17. The optical imaging lens as claimed in claim 12, wherein the optical imaging lens further meets a relational expression:

1.1<(CT3+T34)/CT4<1.4, wherein, the CT3 is a central thickness of the third lens on the optical axis, the T34 is a spacing distance on the optical axis between the third lens and the fourth lens, and the CT4 is a central thickness of the fourth lens on the optical axis.

18. The optical imaging lens as claimed in claim 12, wherein the optical imaging lens further meets a relational expression:

3.5<SL/(CT1+T12+CT2)<3.8, wherein, the SL is a spacing distance on the optical axis between the diaphragm and the imaging surface, the CT1 is a central thickness of the first lens on the optical axis, the T12 is a spacing distance on the optical axis between the first lens and the second lens, and the CT2 is a central thickness of the second lens on the optical axis.

19. The optical imaging lens as claimed in claim 12, wherein the optical imaging lens further meets a relational expression:

4.6<f45/(CT4+CT5)<5.7, wherein, the f45 is a synthetic focal length for the fourth lens and the fifth lens, the CT4 is a central thickness of the fourth lens on the optical axis, and the CT5 is a central thickness of the fifth lens on the optical axis.

20. The optical imaging lens as claimed in claim 12, wherein the optical imaging lens further meets a relational expression: 1.7<SAG42/SAG22<2.5, wherein, the SAG42 is an on-axis distance from an intersection between the image-side surface of the fourth lens and the optical axis to an effective radius vertex of the image-side surface of the fourth lens, and the SAG22 is an on-axis distance from an intersection between an image-side surface of the second lens and the optical axis to an effective radius vertex of the image-side surface of the second lens.

* * * * *